US011354277B2

(12) United States Patent
Cole et al.

(10) Patent No.: US 11,354,277 B2
(45) Date of Patent: Jun. 7, 2022

(54) SYSTEMS AND METHODS FOR HIERARCHICAL DELEGATION OF AUTHORING CONTROL IN A DISTRIBUTED ELECTRONIC CONTENT MANAGEMENT ENVIRONMENT

(71) Applicant: Open Text Corporation, Waterloo (CA)

(72) Inventors: Jeffrey Alan Cole, Georgetown, KY (US); James Matthew Downs, Lexington, KY (US); Steven Mark Cheal, Lexington, KY (US); Jack Dwane Gilvin, Nicholasville, KY (US); Jeffrey Michael Doyle, Nicholasville, KY (US)

(73) Assignee: OPEN TEXT CORPORATION, Waterloo (CA)

( * ) Notice: Subject to any disclaimer, the term of this patent is extended or adjusted under 35 U.S.C. 154(b) by 96 days.

(21) Appl. No.: 16/208,279

(22) Filed: Dec. 3, 2018

(65) Prior Publication Data

US 2020/0012623 A1 Jan. 9, 2020

Related U.S. Application Data

(60) Provisional application No. 62/694,823, filed on Jul. 6, 2018.

(51) Int. Cl.
| | |
|---|---|
| *G06F 16/176* | (2019.01) |
| *G06Q 10/10* | (2012.01) |
| *G06F 21/62* | (2013.01) |
| *G06F 40/186* | (2020.01) |

(52) U.S. Cl.
CPC ...... *G06F 16/1767* (2019.01); *G06F 21/6227* (2013.01); *G06F 40/186* (2020.01); *G06Q 10/103* (2013.01)

(58) Field of Classification Search
None
See application file for complete search history.

(56) References Cited

U.S. PATENT DOCUMENTS

| | | | |
|---|---|---|---|
| 2004/0230891 A1* | 11/2004 | Pravetz | G06F 21/6218 715/229 |
| 2009/0150761 A1* | 6/2009 | Sawicki | H04L 63/08 715/216 |
| 2014/0298178 A1* | 10/2014 | Kilgour | G06F 3/0484 715/730 |
| 2017/0069032 A1* | 3/2017 | Cunningham | G06Q 40/06 |
| 2018/0335935 A1* | 11/2018 | Larson | G06Q 10/101 |
| 2018/0373883 A1* | 12/2018 | Ugale | G06F 21/604 |

* cited by examiner

*Primary Examiner* — Andrea C Leggett
(74) *Attorney, Agent, or Firm* — Sprinkle IP Law Group

(57) ABSTRACT

Embodiments of systems and methods as disclosed may provide a platform agnostic way to edit content within an enterprise. For example, a platform independent thin client editor may be provided such that this editor can be accessed by users at a variety of computing platforms across the distributed computer network of an enterprise, regardless of the platform from which the thin client editor is being accessed. Moreover, certain embodiments may provide a role based mechanism for controlling the editing of content. Embodiments of such a role based mechanism may allow one editor of a content item to designate a role associated with the content item so that only users associated with that role may be allowed to edit the content item or portion of the content item.

15 Claims, 19 Drawing Sheets

TO FIG. 6B

```
OpenText Exstream  ✕   WorkShop - OpenText Ex  ✕
← → C  ⌂  ⓘ  127.0.0.1:9090/index-develop.html#/theme/0BD8F002-0510-A041-8D80-D432F9
                                    opentext™ | Exstream
Summer2018
☐☐☐   🖉
                                                                            Page 1 of 6
                                   Account Information
                                   $                              000 52 58040053
                                   Statement Period              01-29-00 - 02-28-00

Contact Information
                                   🌐   Visit HP Exstream Bank Online Banking at
                                        www.hpexstream.com
                                   📞   Call a Customer Service Representative at
                                        1-800-555-4321, Monday - Friday, 8 am - 12
                                        am (ET), and Saturday, 8 am - 8 pm (ET).
  ‖‖‖‖‖‖‖‖‖‖‖‖‖‖‖‖‖‖‖‖‖‖‖‖‖‖
  0001234 XYZ 056 141 23456 NNNNN P 1 000000 000 05 0000
                                   ▦   Scan the QR Code with your smart phone to
  MARTHA D WILLIAMS                     access HP Bank Customer Service.
  1456 SPADAFORE DRIVE
  CLEARVILLE, PA 15535-7305

Important Messages
       Tax Interest Statement Available by the end of 02-28-00.
  📄   Your IRS Form 1099 (Interest Statement) will be included in next month's statement or mailed
       to you by the end of January. You can also visit www.hpexstream.com to access your
       information. Log into your account and select "See 1099 interest statements" or call our
       customer service center at 1-800-555-4321.
                                                        ⌐ ─ ─
                                                     602
```

This message confirms that you have overdraft protection on your checking account.

Deposits and Additions

| DATE | DESCRIPTION | AMOUNT |
|---|---|---|
| 02-26-00 | Deposit | $475.50 |
| Total Deposits and Additions | | $475.50 |

Check Paid

| CHECKNO. | DESCRIPTION | | DATE PAID | AMOUNT |
|---|---|---|---|---|
| 1263 | CHECK NO. 1263 Petsmart 1545 | | 02-21-00 | $45.62 |
| 1264 | CHECK NO. 1264 Kroger Mkt 23 | Food | 02-24-00 | $137.14 |
| 1265 | CHECK NO. 1265 Shell Oil | Gasoline | 02-24-00 | $97.93 |
| Total Checks Paid | | | | $280.69 |

If you see a description in the Check Paid section, it means that we received only electronic information about the check, not the original or an image of the check. As a result we are not able to return the check to you or show you the image.

Bank Card and ATM Withdrawals

| DATE | DESCRIPTION | AMOUNT |
|---|---|---|
| 02-19-00 | ATM Withdrawal, Boston Road, Lexington KY | $50.00 |
| 02-19-00 | Bank Card POS Purchase, Walmart, Lexington KY | $13.24 |
| 02-22-00 | Bank Card POS Purchase, Speedway, Georgetown KY | $58.60 |
| 02-19-00 | Bank Card POS Purchase, Burger King, Cincinnati OH | $8.12 |
| 02-19-00 | Bank Card POS Purchase, MiniMart, Cincinnati OH | $6.22 |
| 02-22-00 | Bank Card POS Purchase, Kroger, Georgetown KY | $28.00 |
| 02-24-00 | ATM Withdrawal, High Street, Nicholasville KY | $40.00 |
| 02-22-00 | Bank Card POS Purchase, Wendys, Nicholasville KY | $7.11 |
| 02-24-00 | Bank Card POS Purchase, Walmart, Lexington KY | $100.30 |
| 02-25-00 | ATM Withdrawal, Harrodsburg Road, Versailles KY | $50.00 |

Page 2

FROM FIG. 6B

FROM FIG. 6C

TO FIG. 7B

OpenText Exstream | WorkShop - OpenText Ex
Secure | https://exstreammghost.opentext.net:8443/exstream/index.html#/theme/ opentext™ | Exstream

Summer2018

Reserved

Page 1 of 6

0001234 XYZ 056 141 23456 NNNNNNNNNNN P 1 000000 000 05 0000
MARTHA D WILLIAMS
1456 SPADAFORE DRIVE
CLEARVILLE, PA 15535-7305

Account Information
$     000 52 58040053
Statement Period     01-29-00 - 02-28-00

Contact Information

Visit HP Exstream Bank Online Banking at
www.hpexstream.com

Call a Customer Service Representative at
1-800-555-4321, Monday - Friday, 8 am - 12
am (ET), and Saturday, 8 am - 8 pm (ET).

Scan the QR Code with your smart phone to
access HP Bank Customer Service.

*Important Messages*

Tax Interest Statement Available by the end of 02-28-00.
Your IRS Form 1099 (Interest Statement) will be included in next month's statement or mailed
to you by the end of January. You can also visit www.hpexstream.com to access your
information. Log into your account and select "See 1099 interest statements" or call our
customer service center at 1-800-555-4321.

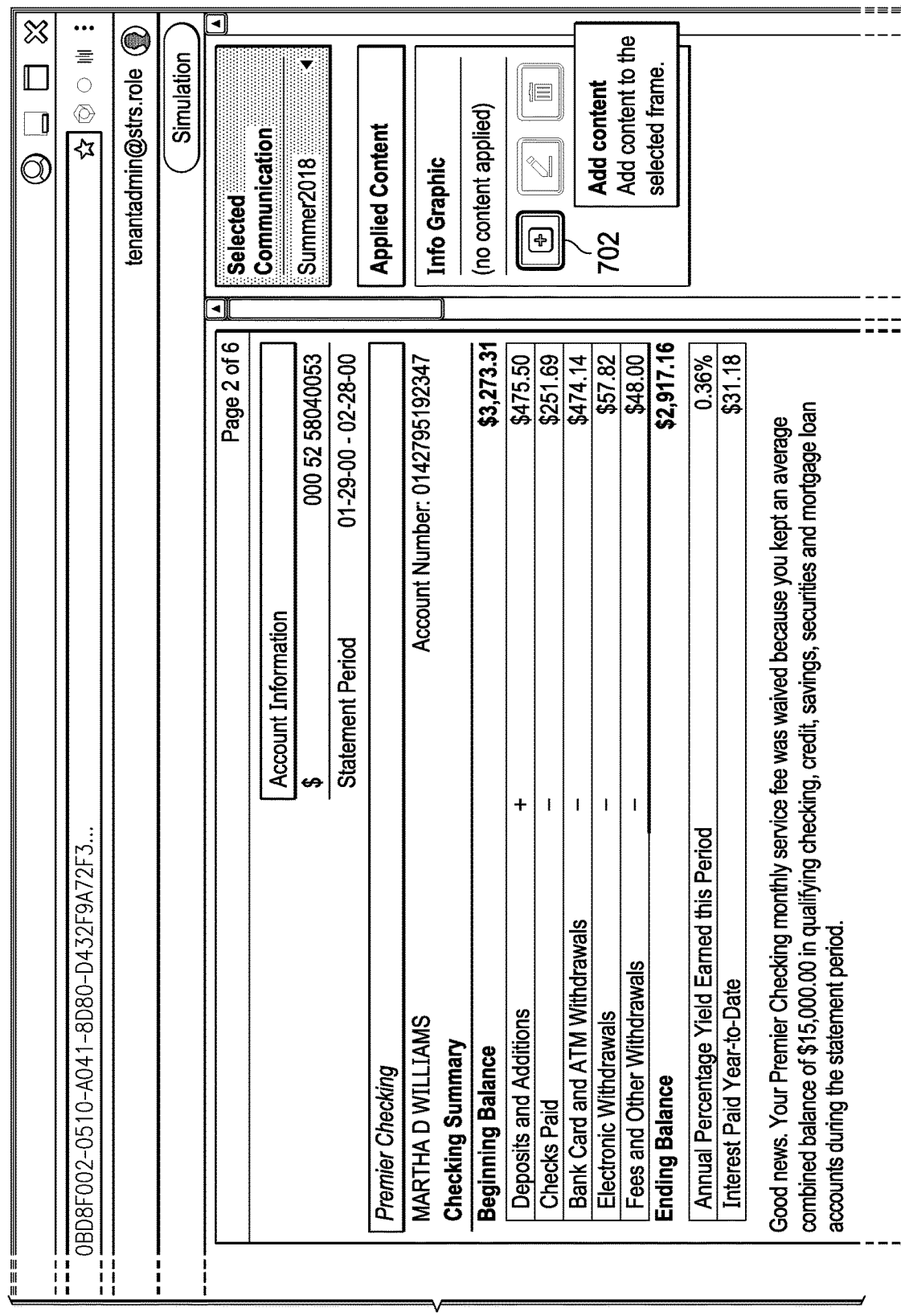

FIG. 7D

This message confirms that you have overdraft protection on your checking account.

Deposits and Additions

| DATE | DESCRIPTION | AMOUNT |
|---|---|---|
| 02-26-00 | Deposit | $475.50 |
| Total Deposits and Additions | | $475.50 |

Check Paid

| CHECK NO. | DESCRIPTION | | DATE PAID | AMOUNT |
|---|---|---|---|---|
| 1263 | CHECK NO. 1263 Petsmart 1545 | | 02-21-00 | $45.62 |
| 1264 | CHECK NO. 1264 Kroger Mkt 23 | Food | 02-24-00 | $137.14 |
| 1265 | CHECK NO. 1265 Shell Oil | Gasoline | 02-24-00 | $97.93 |
| Total Checks Paid | | | | $280.69 |

If you see a description in the Check Paid section, it means that we received only electronic information about the check, not the original or an image of the check. As a result we are not able to return the check to you or show you the image.

Bank Card and ATM Withdrawals

| DATE | DESCRIPTION | AMOUNT |
|---|---|---|
| 02-19-00 | ATM Withdrawal, Boston Road, Lexington KY | $50.00 |
| 02-19-00 | Bank Card POS Purchase, Walmart, Lexington KY | $13.24 |
| 02-22-00 | Bank Card POS Purchase, Speedway, Georgetown KY | $58.60 |
| 02-19-00 | Bank Card POS Purchase, Burger King, Cincinnati OH | $8.12 |
| 02-19-00 | Bank Card POS Purchase, MiniMart, Cincinnati OH | $6.22 |
| 02-22-00 | Bank Card POS Purchase, Kroger, Georgetown KY | $28.00 |
| 02-24-00 | ATM Withdrawal, High Street, Nicholasville KY | $40.00 |
| 02-22-00 | Bank Card POS Purchase, Wendys, Nicholasville KY | $7.11 |
| 02-24-00 | Bank Card POS Purchase, Walmart, Lexington KY | $100.30 |
| 02-25-00 | ATM Withdrawal, Harrodsburg Road, Versailles KY | $50.00 |

Page 2

FROM FIG. 7B

FROM FIG. 7C

tenantadmin@strs.role

Simulation

Selected Communication
Summer2018

Applied Content

Info Graphic
Test

Affected Communications
Summer2018
(no others affected)

Page 2 of 6

*Premier Checking*

MARTHA D WILLIAMS

Checking Summary

| Account Information | |
|---|---|
| $ | 000 52 58040053 |
| Statement Period | 01-29-00 - 02-28-00 |

Account Number: 0142795192347

| | | |
|---|---|---|
| Beginning Balance | | $3,273.31 |
| Deposits and Additions | + | $475.50 |
| Checks Paid | – | $251.69 |
| Bank Card and ATM Withdrawals | – | $474.14 |
| Electronic Withdrawals | – | $57.82 |
| Fees and Other Withdrawals | – | $48.00 |
| Ending Balance | | $2,917.16 |
| Annual Percentage Yield Earned this Period | | 0.36% |
| Interest Paid Year-to-Date | | $31.18 |

Good news. Your Premier Checking monthly service fee was waived because you kept an average combined balance of $15,000.00 in qualifying checking, savings, credit, securities and mortgage loan accounts during the statement period.

FROM FIG. 9A

This message confirms that you have overdraft protection on your checking account.

Deposits and Additions

| DATE | DESCRIPTION | AMOUNT |
|---|---|---|
| 02-26-00 | Deposit | $475.50 |
| Total Deposits and Additions | | $475.50 |

Check Paid

| CHECKNO. | DESCRIPTION | | DATE PAID | AMOUNT |
|---|---|---|---|---|
| 1263 | CHECK NO. 1263 Petsmart 1545 | | 02-21-00 | $45.62 |
| 1264 | CHECK NO. 1264 Kroger Mkt 23 | Food | 02-24-00 | $137.14 |
| 1265 | CHECK NO. 1265 Shell Oil | Gasoline | 02-24-00 | $97.93 |
| Total Checks Paid | | | | $280.69 |

If you see a description in the Check Paid section, it means that we received only electronic information about the check, not the original or an image of the check. As a result we are not able to return the check to you or show you the image.

Bank Card and ATM Withdrawals

| DATE | DESCRIPTION | AMOUNT |
|---|---|---|
| 02-19-00 | ATM Withdrawal, Boston Road, Lexington KY | $50.00 |
| 02-19-00 | Bank Card POS Purchase, Walmart, Lexington KY | $13.24 |
| 02-22-00 | Bank Card POS Purchase, Speedway, Georgetown KY | $58.60 |
| 02-19-00 | Bank Card POS Purchase, Burger King, Cincinnati OH | $8.12 |
| 02-19-00 | Bank Card POS Purchase, MiniMart, Cincinnati OH | $6.22 |
| 02-22-00 | Bank Card POS Purchase, Kroger, Georgetown KY | $28.00 |
| 02-24-00 | ATM Withdrawal, High Street, Nicholasville KY | $40.00 |
| 02-22-00 | Bank Card POS Purchase, Wendys, Nicholasville KY | $7.11 |
| 02-24-00 | Bank Card POS Purchase, Walmart, Lexington KY | $100.30 |
| 02-25-00 | ATM Withdrawal, Harrodsburg Road, Versailles KY | $50.00 |

Page 2

FROM FIG. 9B

FROM FIG. 9C

SYSTEMS AND METHODS FOR HIERARCHICAL DELEGATION OF AUTHORING CONTROL IN A DISTRIBUTED ELECTRONIC CONTENT MANAGEMENT ENVIRONMENT

RELATED APPLICATION(S)

This application claims a benefit of priority under 35 U.S.C. § 119 from U.S. Provisional Patent Application No. 62/694,823 filed Jul. 6, 2018, by inventors Cheal, Gilvin, Doyle and Downs, entitled "HIERARCHICAL DELEGATION OF AUTHORING CONTROL," the entire contents of which are hereby fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to the management, development, editing, deployment and communication of content. More particularly, this disclosure relates to embodiments of systems and methods for editing content in a distributed network environment. Even more specifically, this disclosure relates to embodiments of systems and methods for editing content within a distributed, networked, enterprise environment, including role based or hierarchical editing of content in an enterprise environment using editing applications, including those deployed as network based thin-client applications.

BACKGROUND

Ever since the advent of the computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. Previously, most enterprises kept departments siloed by function. For example, a website team was separate from their print team, which was separated from the marketing team. Content within the enterprise may have been similarly segmented; one department maintained and used the content within that department.

Now, however, all these disparate parts of an enterprise are starting to converge and overlap. In this converged environment, the various departments may share a number of assets and the departments may utilize assets from across the enterprise. Moreover, assets may build upon one another, such that an asset created by one department may include assets from one or more other departments.

To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore results in an extremely complex web of interconnectivity involving hundreds or sometimes thousands of systems or people.

While the types of content management systems discussed above are useful in creating, versioning and controlling access to content, they do not provide an easy and straightforward ability to collaboratively edit content within an enterprise, especially in cases where such content may be an amalgam or composite of individual content items distributed across the enterprise edited by multiple users within an enterprise where those users may have different roles within the enterprise. It is thus difficult to control the editing of content within an enterprise while simultaneously providing a simple and straightforward way to edit such content.

It would be desirable, therefore, to have provider users the ability to easily edit content within a distributed network environment of an enterprise while also being able to control the editing of the content by such users.

SUMMARY

Accordingly, embodiments as disclosed may provide a platform agnostic way to edit content within an enterprise. For example, a platform independent thin-client editor may be provided such that this editor can be accessed by users at a variety of computing platforms across the distributed computer network of an enterprise, regardless of the platform from which it's being accessed. Users editing content may thus be provided with a similar editing interface (and capabilities) irrespective of the platform on which they are editing the content.

Moreover, certain embodiments may provide a role based mechanism for controlling the editing of such content. Such a role based mechanism may, for example, allow one editor of a content item (e.g., a creator of a content item) to designate a role associated with the content item (or portions of the content item such as other content items incorporated into a content item) such that only users associated with that role may be allowed to edit the content item or portion of the content item.

When a user is editing a particular content item using a content editor then, a designation of which (if any) portions of the content item (including the entire content item) available for them to edit may be presented to the user. This designation can be, for example, a visual designation, including for example, highlighting or outlining the portions of the content item available for editing in a display of the editor.

In this manner, the editing of content items or portions thereof may be controlled by other editors (including the creator of the content item) based on users' roles within the enterprise on a granular level. Additionally, such roles may be roles internal to the enterprise itself such as those specified or designated by the user management systems within the enterprise, including directory services systems or identity management systems.

Embodiments may therefore provide an easy and straightforward ability to collaboratively edit, and control the editing of, content within an enterprise, especially in cases where such content may be an amalgam or composite of individual content items distributed across the enterprise edited by multiple users within an enterprise where those users may have different roles within the enterprise.

For example, a microcosm of this problem exists with respect to communication management within an enterprise. Oftentimes enterprises wish to communicate with their customers or other entities with whom they wish to engage (e.g., distributors, partners, regulatory bodies, donators, etc.). To that end, they may integrate a customer communication management (CCM) system into the enterprise. CCM solutions support these objectives, providing companies with an application to improve outbound communications with their distributors, partners, regulatory bodies, customers or others.

Such CCM systems may allow an enterprise (e.g., almost any profit or non-profit entity such as a service company, an insurance or utility company or another type of entity) to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, mobile applications, etc. One example of a CCM is Exstream from OpenText.

To utilize such a CCM, in most cases a user at an enterprise creates a content item (e.g., a template) that includes a number of assets (e.g., other content items), where each of the assets may be from one or more other distributed network locations such as a DAM, WCM or ECM within that enterprise. The CCM may use the template to generate a communication for a user associated with the enterprise (e.g., a customer) and deliver that communication in a format and through a communication channel associated with that user (e.g., as determined from a user or customer database). It is common for enterprises to have hundreds of thousands of templates for use in their CCMs, where these templates can generate millions of communications per month or more.

Moreover, these templates may be edited by a variety of users within the enterprise to create other or different communications for particular purposes. As can be seen, embodiments of the systems and methods disclosed may be effectively used in an enterprise environment in association with these types of CCMs to provide the ability to collaboratively edit, and control the editing of, content (including templates) in such an environment. As such, many embodiments as disclosed herein are explained in association with their use or deployment in conjunction with a CCM system. It will be understood, however, that other embodiments may be utilized in association with other systems and environments and all such embodiments are fully contemplated herein.

Embodiments as disclosed herein can thus provide a number of advantages and technological improvements to the functioning of computer systems and other technology. In particular, embodiments may reduce the processing burden on computing device within the distributed network enterprise computing environment by virtue of implementing editing functionality using a thin client editing application utilizing an editor services server. Specifically, by eliminating the need to install a thick client editing application on each user's computer within the enterprise environment, the number of processor cycles, memory usage and disk accesses performed by the user's computer may be significantly reduced.

Moreover, embodiments may allow fine granularity control over editing of documents based on user role. While many design tools are tailored for a specific type of user, embodiments as disclosed may allow dynamic tailoring of editing capabilities based on user role where there are hierarchical designations of editing functionality. Additionally, embodiments may allow creators or other editors of content to control the downstream editing of that content as opposed to having editing controlled or enforced through a thick client application from a central location which is difficult.

As another advantage, as editors may be implemented as thin-clients the litany of problems associated with installing and maintaining thick-clients across a distributed enterprise environment which may comprise tens of thousands of users may be alleviate. Such a thin-client editor may provide a familiar interface and increased usability regardless of a user's platform.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3A, 3B, 4, 5, 6A-6D, 7A-7D, 8, 9A-9D depict embodiments of interfaces for design or editing applications.

DETAILED DESCRIPTION

Figure 1:
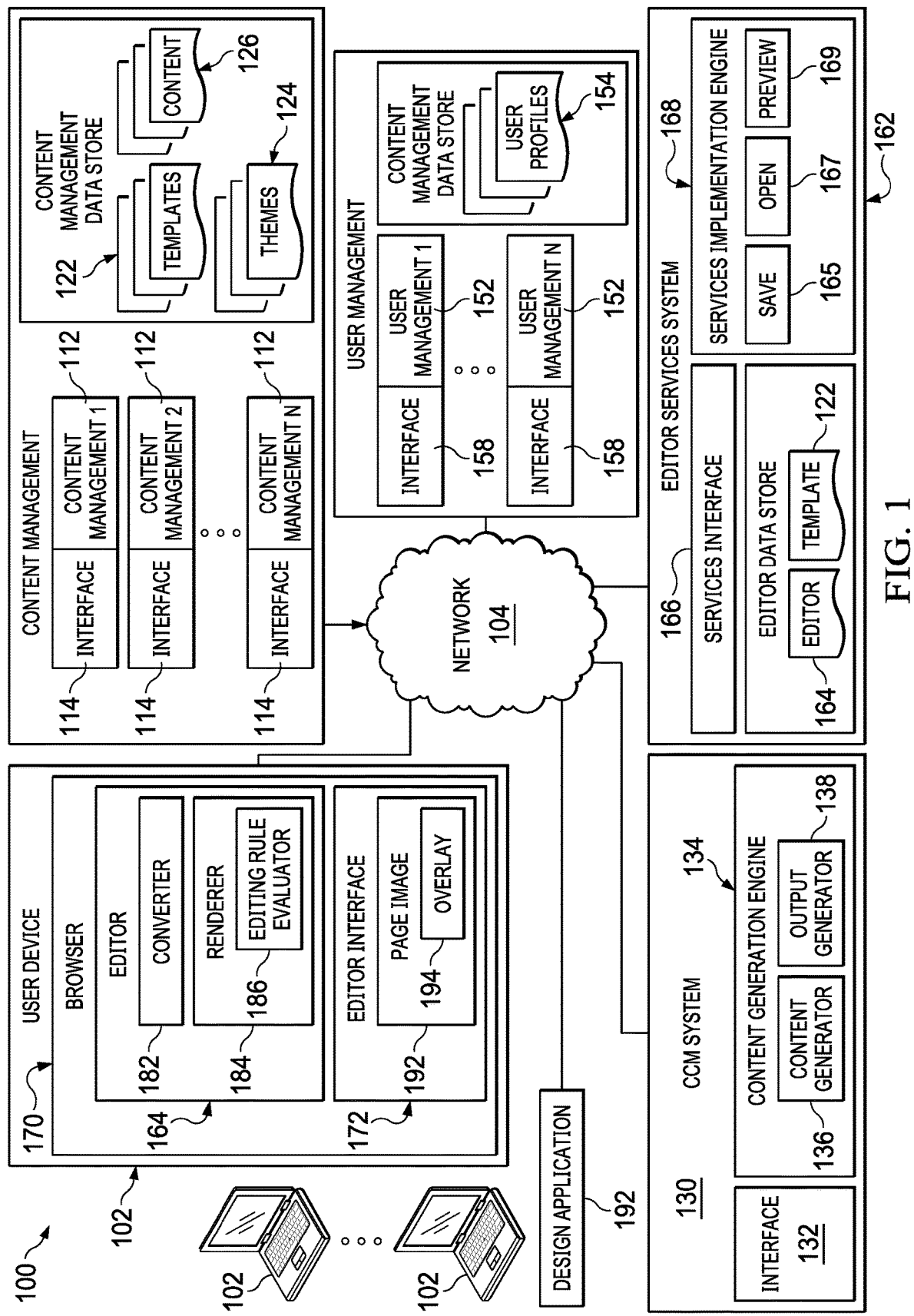
FIG. 1 is a diagrammatic representation of an architecture of a distributed enterprise environment including a communications management server and a thin-client editor.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed above, ever since the advent of the computer networks (including the Internet), enterprise environments have been steadily growing more complicated, encompassing an ever-expanding amount of increasingly complex digital content (or just content or assets). In an enterprise environment, this content may be widely distributed and used for a wide variety of purposes in association with that enterprise. In such an enterprise environment, the various departments or areas of the enterprise may share a number of content items and may utilize content from across the enterprise. Moreover, content items may build upon one another, such that a content item created by one department may include content items from one or more other departments.

To aid in managing and using their various assets, many enterprises have employed a number of content management systems. Thus, the distribution of content across an enterprise in these various management systems along with widespread and distributed use of such content results in an extremely complex web of interconnectivity involving hundreds or sometimes thousands of people or more.

While these content management system may aid in managing individual content items, they do not provide an easy and straightforward ability to collaboratively edit content within an enterprise, especially in cases where such content may be an amalgam or composite of individual content items distributed across the enterprise edited by multiple users within an enterprise, where those users may have different roles within the enterprise. It is thus difficult to control the editing of content within an enterprise while simultaneously providing a simple and straightforward way to edit such content.

As an example, an enterprise may integrate a customer communication management (CCM) system into the enterprise. Such CCM systems may allow an enterprise (e.g., almost any profit or non-profit entity such as a service company, an insurance or utility company or another type of entity) to improve the creation, delivery, storage or retrieval of outbound communications, including communications used for marketing, new product introductions, renewal notifications, claims correspondence, documentation, bill statements, advertising, payment notifications, etc.

To utilize such a CCM, in most cases a user at an enterprise creates a content item (e.g., a template) that includes a number of assets (e.g., other content items), where each of these content items may be from one or more other distributed network locations such as a DAM, WCM or ECM within that enterprise. The CCM may use the template to generate a communication for a user associated with the enterprise (e.g., a customer) and deliver that communication in a format and through a communication channel associated with that user (e.g., as determined from a user or customer database). It is common for enterprises to have hundreds of thousands of templates for use in their CCMs, where these templates can generate millions of communications per month or more.

It would thus be desirable in such a context to easy and straightforward ability to collaboratively edit, and control the editing of, templates and other content in association with a CCM system where the templates and content may themselves be managed by content management system within an enterprise, where the templates or other content may themselves be comprised of other individual content items distributed across the enterprise's content management systems and may be edited by multiple users having different roles within the enterprise.

To those ends, among others, embodiments of systems and methods as disclosed may provide a platform agnostic way to edit content within an enterprise. For example, a platform independent thin client editor may be provided such that this editor can be accessed by users at a variety of computing platforms across the distributed computer network of an enterprise, regardless of the platform from which the thin client editor is being accessed. Users editing content using this thin client application may thus be provided with a similar editing interface (and capabilities) irrespective of the platform on which they are editing the content. A thin client as used herein will refer to a network based application that does not require a platform or operating system specific application to be installed on a client device and utilizes network interface provided by a server supporting the thin-client application to accomplish at least a portion of the functionality associated with the thin client application.

Moreover, certain embodiments may provide a role based mechanism for controlling the editing of such content. Such a role based mechanism may, for example, allow one editor of a content item (e.g., a creator of a content item) to designate a role associated with the content item (or portions of the content item such as other content items incorporated into a content item) so that only users associated with that role may be allowed to edit the content item or portion of the content item.

When a user is editing a particular content item using a content editor then, a designation of which (if any) portions of the content item (including the entire content item) available for them to edit may be presented to the user. This designation can be, for example, a visual designation, including for example, highlighting or outlining the portions of the content item available for editing in a display of the editor.

In this manner, the editing of content items or portions thereof may be controlled by other editors of the content (including the creator of the content item) based on users' roles within the enterprise on a granular level. Additionally, such roles may be roles internal to the enterprise itself such as those specified or designated by the user management systems within the enterprise, including directory services systems or identity management systems.

Referring then to FIG. 1, an example of an architecture of a distributed enterprise environment employing a thin client content editor is depicted. Enterprise environment 100 may be a distributed, networked computing environment comprising a plurality of computing system or applications coupled through network 104. Network 104 may be the Internet, an intranet, a wireless or wired network, a local access network (LAN), a wide access network (WAN), a cellular network or some combination of these types of networks, or another type or types of networks.

To manage the users of the enterprise 100, the enterprise may include one or more user management systems 152. These user management systems 152 may include directory services systems such as Active Directory or OpenText Director Services (OTDS), domain controllers, identity management systems or the like. Each of the user management systems 152 may store a user profile 154 storing data for a particular user or group of users. This data may include, for example, user names or passwords, groups, roles or identities associated with a user, or group of users (collectively referred to herein as roles), or other data regarding users. These roles may be roles defined, for example, by the enterprise based on, a real world characteristic of the user (e.g., their department, group, manager, geographical location, etc.), a virtual characteristic of the user (e.g., the access level or set of entitlements held or utilized by the user) or some other criteria.

Here, for or purposes of illustration, the data stores of each user management system 152 has been depicted as a single data store, however, it will be understood that each user management system 152 may have its own separate local or remote data store, the data store of some user management systems 152 may be combined while other user management systems 152 may have their own local or remote data store, or some other configuration of data stores for user management systems 152 may be utilized.

Each of the user management systems 152 may include an interface 158 through which access can be provided to the user profiles 154 to, for example, authenticate a user of the enterprise or obtain other data from the user profile such as a role or other data associated with a user. This interface 158 may be a services (e.g., a web services) interface accessible over network 104 for submission of requests to a network location or endpoint (such as a Uniform Resource Locator (URL) for a particular service offered by the user management system 152 and through which to return responses to those requests. Such an interface 114 may be, for example, a REpresentational State Transfer (REST) or RESTful web service that presents a REST interface through which such requests may be received and response returned.

It will be noted that the interface 158 may be a single interface for all user management systems 152 that may be implemented, for example, by the enterprise to provide a common interface to the one or more user management systems 152. For instance, such an interface 158 may be implemented as part of a set of common services or a service gateway offered by the enterprise. In this manner, requests from the various entities of components of the distributed network architecture of the enterprise may send requests in the same or a similar format to such a service or service gateway and the request may be implemented with respect to one or more of the user management systems 152 without the requestor being require to have knowledge of the specific interface offered by that user management system 152.

The computing systems of the enterprise environment 100 may also include a number of content management systems 112. These content management systems 112 may include, for example, content management systems such as a DAM, a, a WCM, an ECM or another type of content management system. Each of the content management systems 112 may operate generally to allow users or an application to access, create or modify content managed by the corresponding system 112 using a provided interface 114. This content can include templates 122, themes 124 or other content 126 as will be discussed in more detail herein. These managed assets may, for example, be stored locally in a content management data store 116 associated with the system 112 or stored at a remote location. In conjunction with the creation or modification of assets, these content management systems 112 may also allow the user to access or incorporate assets managed (and in some cases stored) at other content management systems in the enterprise environment 100.

Again, for or purposes of illustration, the data store of each content management system has been depicted as a single data store, however, it will be understood that each content management system 112 may have its own separate local or remote data store, the data store of some content managements systems 112 may be combined while other content management systems 112 may have their own local or remote data store, or some other configuration of data stores for content management systems 112 may be utilized.

Accordingly, each of the content management systems 112 may include an interface 114 through which access can be provided to the managed assets on that system 112. This interface may be a services (e.g., a REST web services) interface accessible over network 104 for submission of requests to a network location or endpoint (such as a URL) for a particular service and through which to return responses to those requests. The interface 114 may be a single interface for all content management systems 112 that may be implemented, for example, by the enterprise to provide a common interface to the one or more content management systems 112 and may be implemented as part of a set of common services or a service gateway offered by the enterprise as discussed.

Thus, a user or application may create, modify or otherwise accesses an asset at a content management system 112 through interface 114. Interface 114 at that system can also be used to access and include other assets managed by another content management system 112 in an asset being created or modified at that system 112. The assets (including assets incorporating other assets managed by the other content management systems 112) can be accessed by the content management system 112 with which a user is interacting using connectors at that content management system 112 and the content management system 112 at which the included asset resides. The created or modified asset can then be saved and managed by the content management system 112 with which the user is interacting.

In this way, a user at a user device 102 can utilize a content management system 112 to create or modify an asset for the enterprise environment 100 where the created or modified asset may include other assets of the enterprise environment 100 residing at that, or another, content management system 112. It will be apparent that these other assets may, in turn, also include assets managed by that, or another, content management system 112. The created or modified asset can then be stored and managed at the content management system 112.

As discussed above, oftentimes enterprises wish to communicate with their customers or other entities with whom they wish to engage. Thus, enterprise environment 100 may also include CCM system 130. CCM system 130 is itself a type of content management system that provides an interface 132 through which a user or an application at a computing device 102 in enterprise environment 100 may create an asset, including the creation of a template 122 that includes a number of other assets, where each of the assets may be from one or more other distributed network locations such as content management systems 112 within the enterprise environment 100. As discussed, the interface 132 may be a services (e.g., a REST web services) interface accessible over network 104 for submission of requests to a network location or endpoint (such as a URL) for a particular service and through which to return responses to those requests, where that interface may be implemented as part of a set of common services or a service gateway offered by the enterprise. Examples of such a CCM system 130 include OpenText Exstream and Communications Center Enterprise.

Specifically, in one embodiment, users at computing devices 102 may utilize a design or authoring application 192 associated with the CCM system 130 to design such templates 122. The design application 192 may, for example a resident application at the user's computing device 102 such as a desktop application or may be a web based application as are known in the art Examples of design applications 192 are OpenText's Design Manager, Story-Teller, LiveEditor and Content Author.

The user can then interact with the design application 192 to design a template 122. As mentioned, this template 122 (e.g., a template) may include, or specify, a number of assets (e.g., other content items), where each of these content items may be located in one or more other distributed network locations such as in the content management systems 112 within the enterprise. This template, may, for example, be an eXtensible Markup Language (XML) document describing each page of the template, identifying content 126 to appear on each of the pages, areas of each page, including for example, the location and size of content 126 on the page (e.g., using document identifiers or locations within content management systems 112), what on each page of the template is editable, where content can be added, or other information associated with the template. An The design application 192 may thus present the user with a graphical interface at the user's computing device 102 to allow the user to design and select content items in content management systems 112 for inclusion in the created template 122 and to specify which areas of the template may accept content or where content may otherwise be changed, added, removed or edited. The design application 192 may also allow the designed template 122 to be saved in a content management system 112 of the enterprise such that the template 122 may be managed as content of the enterprise.

Certain instances of design application 192 may also allow the user to interact with the design application 192 to design a template in association with the CCM system 130. In particular, the design application 192 may present a graphical to a user at the user's computing device 102 and allow a user to select content and design a template 122, whereby the design application 192 requests services from CCM system 130 to accomplish the requested functions.

As discussed, the graphical user interface presented by the design application 192 may allow a user to select content items in content management systems 112 for inclusion in the created template 122. The design application 192 may also allow the designed template 122 to be saved in a content management system 112 of the enterprise such that the template 122 may be managed as content of the enterprise. Here, the CCM system 130 may include a content generation engine 134 for servicing requests received through the interface 132 of the CCM system 130. The design application 192 may request services provided by the CCM system 130 in association with the user's access or selection of content managed by content management systems 112 and the user's design and saving of a template 122. These requests may be received through interface 132 and services by the content generator engine 134 using a content generator module 136.

The content generator 136 of CCM system 120 may use these templates 122 to generate communications for users associated with the enterprise (e.g., a customer) and deliver that communication in a format and through a communication channel associated with that user (e.g., as determined from a user or customer database). For example, a communication may be generated from a template that includes the assets of the template and the communication delivered over network 104 (e.g., the Internet, a cellular network, the publicly switched telephone network (PSTN) or some other network or combination of networks) to a user at his mobile device through an SMS message. Similarly, a communication may be generated from the same template that includes the assets of the template and this communication delivered over network 104 to a user at his computing device through an email.

Specifically, the content generator 136 may evaluate the template 122 to determine the content 126 referenced by the template 126, retrieve the referenced content 126 from the content management systems 112 using through the interfaces 114 provided by the content management systems 112 and render this content according to the template into an output document. This output document many be in one of number of formats, including a CCM system 130 proprietary format or another format such as HyperText Markup Language (HTML) or Portable Document Format (PDF). The content generation engine 134 may also include an output generator 138. The output generator 138 can take as input a document generated by the content generator and generate an output document in a desired format. For example, in cases where the content generator 136 generates an output document in a CCM system 130 specific format, the output generator 138 may convert the document in the CCM system specific format to another format such as HTML or PDF.

It may be recalled from the above discussion that it is desired to give users across the enterprise the ability to edit such templates such the templates (or versions thereof) may be tailored to a specific user's or group's needs. However, in most cases design application 192 is tailored for a specific type of very knowledgeable user. Thus, the creation or editing of content using those design applications 192 may require highly specialized knowledge. Moreover, in many cases these design applications 192 may be thick client applications requiring a large, processor or memory intensive application to be installed on a user's computing device.

In a dynamic enterprise environment it is therefore desirable to allow less specialized users (such as business users or the like) from across the enterprise to edit these templates. Additionally, it is desired to allow this type of editing to be accomplished in a simple and straightforward manner that requires not only less knowledge, but importantly can be done across different computing platforms in a platform agnostic manner that allows different business users on different platforms to edit templates in a straightforward and intuitive manner using substantially the same interface and functionality regardless of their platform.

To that end, among others, embodiments may utilize a thin-client editor 164 that operates in association with the editor services system 162 to allow editing of templates. The editor services system 162 may have a services interface 166. The interface 166 may be a services (e.g., a REST web services) interface accessible over network 104 for submission of requests to a network location or endpoint (such as a URL) for a particular service and through which to return responses to those requests.

The editor 164 may be an editing application in a high-level programming language interpretable or executable (terms used herein interchangeably) by an application (e.g., a browser application or the like), operating system or virtual machine commonly resident on a wide variety of computing devices. For example, editor 164 may be a JavaScript application that can be executed by a browser application (e.g., Google Chrome, Mozilla Firefox, Microsoft's Internet Explorer, Apple's Safari, Opera, etc.) substantially regardless of the underlying platform or computing device on which the browser is executing.

Thus, a user at his computing device 102 may access the editor 164 at the editor service system 162, whereby the editor 164 is provided to the user at the user's computing device 102 from the editor services system 162. For example, the user may access a web page associated with the enterprise 100 (e.g., a portal or home page, etc.) using a browser 170 at the user's computing device 102. This web page may have a link or otherwise allow the a request to be made to editor services system 162 for the editor 164. This request, may for example, be received through services interface 166 of the editor services system 162 and the editor 164 (e.g., the JavaScript comprising the editor 164) provided in response to this request.

When the editor 164 is received at the user's computer 102 it can be executed by the browser 170 at the user's computer. The editor 164 may provide an editor interface 172 displayed in the browser 170. A user may utilize the editor interface 172 to select a template 122 to edit. Specifically, the editor 164 may authenticate or otherwise identify the user through interaction with the user management systems 152. Based on the identification of the user, the editor 164 may access one or more locations in content management systems 112 to locate templates 122 accessible or editable by that user and present these templates 122 for selection in the editor interface 172.

In one embodiment, when a user selects a particular template 122, a theme 124 corresponding to that template 122 may be stored in the content management system 122. In one embodiment, the editor 164 at the user's device 102 may access the template 122 or created theme 124 from the content management system 112 and load the template 122 or theme 124 at the user device. A theme 124 may be a version of the template 122 as edited by that user and may have its own specific location and identifier in content management system 112. For purposes of this disclosure, and the systems and methods described and disclosed herein, templates 122 and themes 124 may be thought of interchangeably.

Once a template 122 is selected by the user using the editor 164, an identifier for that template 122 may be obtained by the editor 164 for that selected template 122 and returned to the editor services system 162. This identifier may be, for example, a document or content identifier assigned by the content management system 112. In one embodiment, the editor 164 may send an open request to the editor services system 162 through the services interface 166 identifying the template 122 with the identifier. The open service 167 of the services implementation engine 168 can then service that request by accessing the identified template 122 at the content management system 112 using the identifier and may, in one embodiment, retrieve the identified template 122 and store a copy of the identified template 122 locally in a data store associated with the editor services system 162.

The editor 164 at the user device 162 may also send a request for a preview of a page of the selected template 122 to the editor services system 162 through the services interface 166. The request may identify the template 122 (e.g., using the identifier) and the page for which a preview is being requested. This request may be sent in association with the user selecting a template 122 for opening or subsequently thereto, such as based on a subsequent user interaction with an editor interface presented in the browser 170 by editor 164.

In one embodiment, the editor 164 may send a preview request to the editor services system 162 through the services interface 166 identifying the template 122 (e.g., with the identifier) and the page desired. The preview service 169 of the services implementation engine 168 can then service that request by requesting a preview of the page from the CCM system 130 through the services interface 132 of the CCM system 130. This request may also have the identifier of the template 122 and the page identifier for the page preview desired.

When this request is received at the CCM system 130 the content generator 136 of the content generation engine 134 may access the identified template 122 through the content management system 112 and determine the portion of the identified template 122 associated with the page identified in the request. The content 126 associated with that page identified from the template 122 can be accessed and retrieved from the content management systems 112 and that page of the template generated by the content generator 136. The page generated may be, for example, in HTML or PDF format, or may be converted into HTML or PDF by output generator 138.

Additionally, the content generator 136 may produce a descriptor file for the page generated. This descriptor file may be a file describing the content items on the page, their size, which areas are editable (or not editable) or what type of editing may be done to each area (e.g., what content may be added or deleted from certain areas on the page). This descriptor file may be, for example, an XML file with tags associated with the one or more areas of the associated page. The generated page and the associated page descriptor file may then be returned to the editor service system 162 (e.g., the preview service 169).

The editor services systems 162 can then return the generated page and the associated descriptor file to the originally requesting editor 164 at the user's computer device 102. When the editor 164 at the user's device 102 receives the generated page and the associated descriptor file, the editor 164 may first convert the generated page to an image using converter 182 of the editor. Converter 182 can convert the generated page (e.g., in HTML or PDF format) into an image file format such as JPEG, TIFF, GIF, BMP, etc. to produce image 192. The editor 164 may also generate an overlay 194 for the image 192 using renderer 184.

Renderer 184 may evaluate the page descriptor file to determine areas of the page 192, and the type (if any) of editing functionality allowed for corresponding areas of the page 192 based on the XML of the page descriptor file, and generate overlay 194 that visually indicates (such as by highlighting or the like), for example, what areas or content of the page are editable or what type of editing functionality or capability is allowed in those areas or for that content. Overlay 194 may also include one or more event handlers or the like for receiving or intercepting user interactions with the overlay 194. Overlay 194 may be at least partially transparent.

The generated page image 192 and the corresponding overlay 194 may then be presented in the display of the browser 170 through editor interface 172. This presentation may be accomplished by, for example, writing the generated page image 192, the overlay 194 (or identifiers of the same) or associated markup language into the document object model (DOM) associated with the editor interface 172 such that the page image 192 is displayed in the editor interface 172 and the overlay 194 is displayed above, or on top of, the page image 192. Thus, a user viewing the editor interface 172 may be presented with an interface depicting a page 192 of the template 122 along with corresponding visual identifiers of what areas or content in the displayed page is editable or what type of editing may be done in association with those areas or content.

If the user chooses to edit the page (e.g., to change, add or delete content from areas of the page) and save these changes, the editor 164 may request such a save from the services interface 166 of the editor services system 162. This save request may include data associated with the change, including an identifier of the template 122 or page, or any changes, new, or altered content. This changed or new content may be communicated, for example, as JavaScript Object Notation (JSON) in the save request or subsequently.

When such a request is received the save service 165 of the services implementation engine 168 may save the new or altered content (e.g., a received JSON object) into the content management system 112 in a location associated with the template 122. When the new or altered content is saved into the content management system 112 by the save service 165, the content management system 112 may return an identifier for the saved content (e.g., a document or content identifier as used by the content management system 112). Using this identifier for the newly saved content (e.g., the new or altered content) the save service 165 may alter the template 122 according to the changes (e.g., the template 122 in the editor data store at the editor services system 162) and save the template 122 back to the content management system 112. For example, the identifier for the saved content may be inserted or added into the template 122 at an appropriate location in addition to, or in place of, an identifier for other content.

Subsequently, the editor 164 can make another preview request to the editor services system 162 through the services interface 166 identifying the document and the page desired (which may be the page just edited by the user). The preview service 169 of the services implementation engine 168 can then service that request by again requesting a preview of the page from the CCM system 130 with the identifier of the template 122 and the page identifier for the page preview desired.

When the request is received at the CCM system 130 the content generator 136 of the content generation engine 134 may access the identified (changed) template 122 through the content management system 112. The content 126 associated with that page identified from the template 122 (which may include the changed or added content) can be accessed and retrieved from the content management systems 112 and that page of the template generated by the content generator 136 with the descriptor file.

The generated page and the associated page descriptor file may then be returned to the editor service system 162 and, in turn, to the editor 164 at the user's computer device 102. A new image 192 and overlay 194 can then be produced and displayed to the user in the browser 170 such that the user now sees his edited/updated page in the editor interface 172 displayed in the browser 170 along with an overlay 194 indicating what portions of the page are editable or what type of editing functionality may be done with respect to those areas.

As may be realized, in many cases enterprise environments may have hundreds or thousands (or more) of different types of users, each with different functions and degrees of knowledge, ability and responsibility. By providing a thin-client editor 164 that may be platform agnostic and readily accessible across an enterprise, where that editor may be easily used by many different types of users (including business users or the like), the editing of templates may be opened up to a wide variety of users from across the enterprise.

However, while it may be desirable to open up the editing of such templates to a greater number of users, it is not always desirable to give all of those users the same amount of control over that editing process. What is desired, therefore, is the ability to provide control over the editing of these templates and, in particular, the ability to provide fine granularity control over the editing of such templates such that the editing of templates may controlled at down to the level of particular areas or portions of a template based on specific user characteristics, including roles of users within the enterprise.

Even more specifically, it is desired to provide a fine granularity hierarchical control over the editing of these templates based on user characteristics, including roles, such that a designer or editor of a template who may himself be a non-specialist user (e.g., a business user), may hierarchically designate roles or user characteristics associated with certain areas and associated editing capabilities to control the downstream or later editing of that template based upon the roles of the users who may later edit the template. By providing this capability the editing of the template may be controlled by a creator or editor of the template such that the ability to edit, or the editing capabilities, of the user may be defined or tailored based on the role (and thus the expertise, knowledge, skill, level of responsibility, etc.) of subsequent editors of the template.

To that end, design application 192, CCM system 130, editor 164 and editor services system 162 may provide such fine granularity of control over the editing of templates. As discussed, design application 192 may present the user with a graphical interface at the user's computing device 102 to allow the user to design and select content items in content management systems 112 for inclusion in the created template 122 and to specify which areas of the template may accept content or where content may otherwise be changed, added, removed or edited (collectively edited).

In addition, in certain embodiment, the design application 192 may allow the specification of editing control rules when specifying which areas of the template may accept content or where content may otherwise be changed, added, removed or edited. Thus, an editing control rule associated with an area or content may specify a user characteristic and an associated editing capability for that area or content associated with that user characteristic.

A user characteristic may be a user characteristic associated with a user profile 154 as created or maintained by a user management system 152. Thus, a user characteristics may be a group or role associated with a user within enterprise 100. More particularly, a user characteristic may be a role as defined by a user management system such as an identity management system or the like, including roles that may be specially defined or created by the enterprise, or encompass entitlements of groupings specific to the enterprise. Other user characteristics may be imagined and are fully contemplated herein. In this manner, user characteristics associated with editing controls may be defined based on roles, groups or identities that may be specific to that enterprise, or may be defined based on more general user characteristics.

An editing capability of an editing control rule may define an ability (or lack of ability) to edit an associated area, or a particular type of editing ability. For example, an editing capability may specify that a user may or may not edit an area of the template. An editing capability may also specify that a user may add content, but not delete content, or conversely that a user may delete content but not add content. Other editing capabilities may be imagined and are fully contemplated herein.

To facilitate the specification of these editing control rules, the design application 192 may present a menu comprising user characteristics or editing capabilities such that when the user is creating an area of a template or selecting content to be included in the template, the user may specify one or more user characteristics and one or more associated editing capabilities to define an editing control rule for the area or content. The user characteristics presented by such a menu may, for example, be obtained from content management systems 112 or be defined by a user of the enterprise.

While the above description describes that editing control rules may be specified by a creator of a template 122 using a design or authoring application 192, it will be apparent that in some embodiments, the definition of editing control rules may also be accomplished by other editors of template using other applications (e.g., including, in one embodiment, editor 164). For example, a user with a certain level of authority or role may be granted the ability to add or modify editing control rules in association with subsequent editing of the template. In this manner, hierarchical delegation of editing controls may be further accentuated by allowing different levels of user to designate editing control rules, where those users may (or may not) be restricted to the types of editing control rules they may specify (or with what areas or content they may specify them). Such restrictions may likewise be designated by creators or editors of templates in certain embodiments.

Accordingly, a designed template 122 may include each user specified editing control rule in association with the area or content for which the editing control rule is specified. For example, in embodiments the template 122 is an XML document describing each page of the template, identifying content to appear on each of the pages, areas of each page, including for example, the location and size of content on the page, what on each page of the template is editable or where content can be added. In these embodiments, one or more XML tags may be included in association with XML tags for an area or content of the template to define an editing control rule associated with that area or content. In this manner, the template may define the pages of the template, the content or areas of the pages, the location and size of the content or areas of a page, what on each page of the template is editable or one or more editing control rules (or just editing rules) associated with area or content on each page of the template.

Thus, when a template 122 including such editing control rules is selected for editing by a user using editor 164, template including the editing control rules may be evaluated to generate the page. Here, the descriptor file for the generated page produced by content generator 136 may include the editing rules associated with the content or area on the generated page as included in the template 122. When the editor 164 at the user's device 102 receives the generated page and the associated descriptor file, the editor 164 may first convert the generated page to an image using converter 182 of the editor.

When generating the overlay 194 for the page image, the renderer 184 may evaluate the page descriptor file to determine areas of the page 192, and the type (if any) of editing functionality or capabilities allowed for corresponding areas or content of the page 192 and any corresponding editing rules based on the XML of the page descriptor file. Editing rule evaluator 186 may evaluate each of the editing rule to determine if the user meets the editing rule (e.g., if the user meets the user characteristic of the editing rule).

Specifically, in one embodiment, the editing rule evaluator 186 may send a request to user management system 152 with an identifier of the user editing the template to determine if the user meets the user characteristic. Depending on the interface 158 offered by the user management system 152 this request may include the user characteristic (e.g., the user role or other user characteristic) defined by the editing rule and a request to determine if the identified user meets that characteristic (e.g., the user's profile 154 defines that role for the user or includes the user characteristic as user data). Alternatively, this request may be to obtain user data associated with the user characteristic from the user profile 154 for the identified user, where the editor rule evaluator 186 may compare the obtained user data to the user characteristic defined by the editing rule to determine if the user meets the editing rule.

The editing rules evaluator 186 thus identifies which of the editing rules are met by the user editing template. Thus, when generating an overlay 194, for each area or content on the page associated with an editing rule, the renderer 184 can determine if the user meets the editing rule (e.g., the determination made by the editing rule evaluator 186) Based on the whether the user meets the editing rule, render 184 can determine any editing capability that the user may have with respect to that content or area or the type of editing capability the user may have.

In one embodiment, for each area or content of the page that has an associated editing rule, the renderer 184 determines if the user meets the editing rule and if so, determines the editing capability associated with the editing rule. The render 184 can the generate a portion of the overlay 194 corresponding to that area or content and positioned to overlay the corresponding area or content when displayed or rendered, where that portion of the overlay 194 can (when displayed or rendered) indicate (e.g., visually indicate) the determined editing capability of that user with respect to that content or area.

A visual indicator may, for example, be a highlighting of area or content that may (or may not) be edited by the user, the highlighting of an area or content with a particular color to indicate a particular type of editing capability. Other visual indicators or various editing capabilities may be imagined and are fully contemplated herein.

The generated page image 192 and the corresponding overlay 194 may then be presented in the display of the browser 170 through editor interface 172. This presentation may be accomplished by, for example, writing the generated page image 192, the overlay 194 (or identifiers of the same) or associated markup language into the DOM associated with the editor interface 172 such that the page image 192 is displayed in the editor interface 172 and the overlay 194 is displayed above, or on top of, the page image 192. Thus, a user viewing the editor interface 172 may be presented with an interface depicting a page 192 of the template 122 along with corresponding visual identifiers (e.g., highlighting) in the overlay 194 of what areas or content in the displayed page is editable or what type of editing may be done in association with those areas or content by that particular user based on editing rules defined by the creator of the template (or, in some embodiment, another editor of the template).

Figure 2:
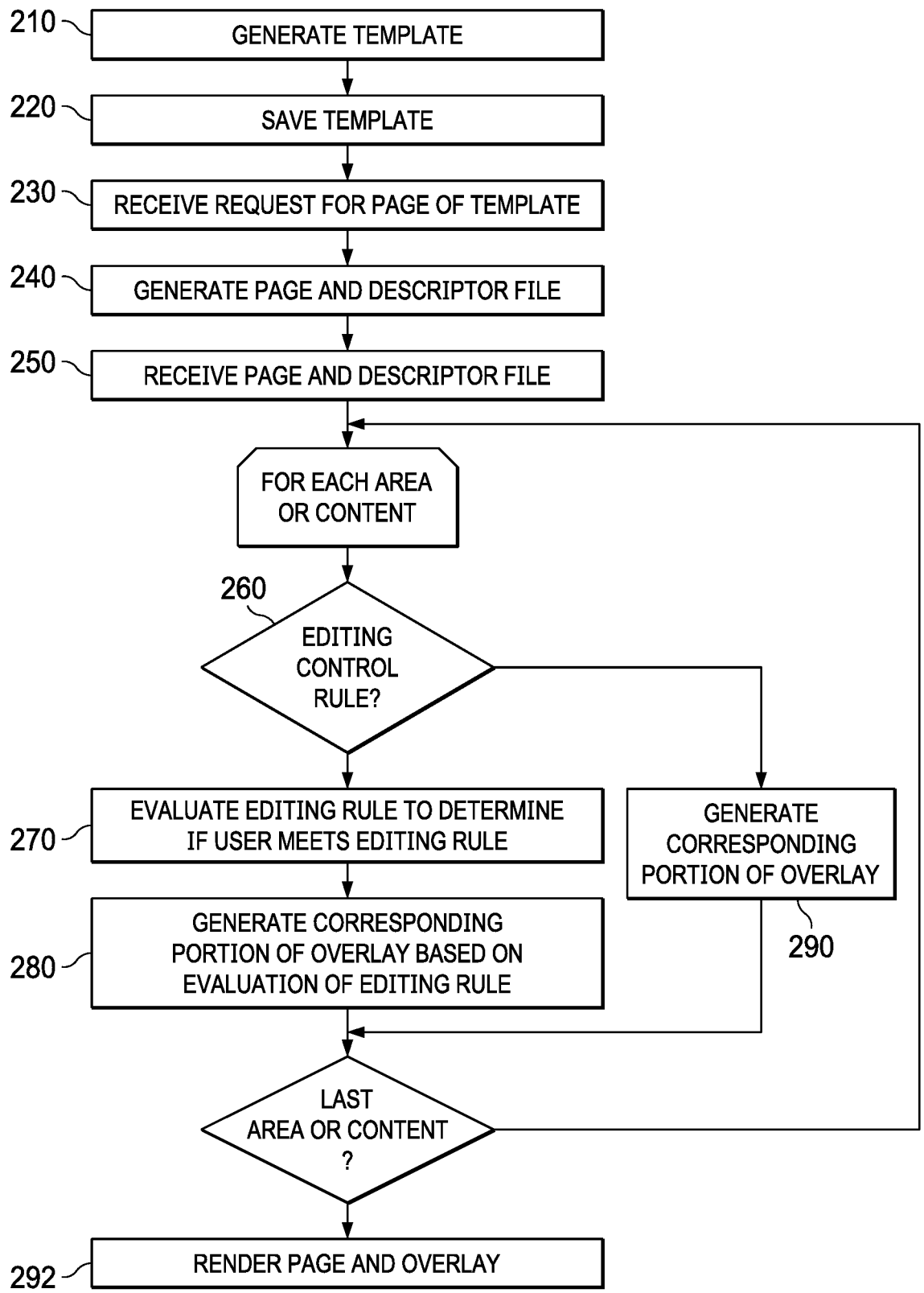
FIG. 2 is a flow diagram of an embodiment of a method for editing content in a distributed enterprise environment.

Referring now to FIG. 2, one embodiment of a method for implementing hierarchical editing controls in a thin-client distributed editing environment. Initially, at step 210, a template including one or more editing control rules may be generated. In one embodiment, users utilize a design application (e.g., which may be associated with a CCM system)

to design a template including, or specifying, a number of assets (e.g., other content items). This template, may, for example, be an XML document describing each page of the template, identifying content to appear on each of the pages, areas of each page, including for example, the location and size of content on the page (e.g., using document identifiers or locations within a content management system), what on each page of the template is editable, where content can be added, or other information associated with the template. The design application may present the user with a graphical interface to allow the user to design and select content items for inclusion in the created template and to specify which areas of the template may accept content or where content may otherwise be changed, added, removed or edited.

When generating the template the user may implement controls over the subsequent editing of the template by specifying one or more editing control rules in association with an area or content of the template. In certain embodiments, the design application may allow the specification of editing control rules when specifying which areas of the template may accept content or where content may otherwise be changed, added, removed or edited. Thus, an editing control rule may specify for an area or content of a template a user characteristic and an associated editing capability associated with that user characteristic.

A user characteristic may be a user characteristic associated with a user profile as created or maintained by a user management system. Thus, a user characteristics may be a group or role associated with a user within an enterprise. More particularly, a user characteristic may be a role as defined by a user management system such as an identity management system or the like, including roles that may be specially defined or created by the enterprise, or encompass entitlements of groupings specific to the enterprise.

An editing capability of an editing control rule may define an ability (or lack of ability) to edit an associated area, or a particular type of editing ability. For example, an editing capability may specify that a user may or may not edit an area of the template. An editing capability may also specify that a user may add content, but not delete content, or conversely that a user may delete content but not add content. Other editing capabilities may be imagined and are fully contemplated herein.

The template may then be saved for later use at step 220. For example, the designed template may be saved in a content management system of an enterprise such that the template may be managed as content of the enterprise. At some later point, this template may be edited by a user.

Accordingly, at step 230 a request to edit a page of the template may be received. In one embodiment, a thin-client editor may be provided to a user at the user's computing device. The editor may provide an editor interface displayed in a browser. A user may use the editor to select a template to edit. The editor may authenticate or otherwise identify the user through interaction with a user management systems. Based on the identification of the user, the editor may access one or more locations in a content management systems to locate templates accessible or editable by that user and present these templates for selection in the editor interface.

The template may then be accessed by the editor. In one embodiment, the editor at the user's device may access the template from the content management system at which it is stored. Once a template is selected by the user using the editor, the editor at the user device may also send a request for a preview of a page of the selected template to an editor services system. The request may identify the template (e.g., using the identifier) and the page for which a preview is being requested. In one embodiment, the editor may send a preview request to the editor services system identifying the template (e.g., with the identifier) and the page desired.

A page may be generated for the requested page of the templated along with a corresponding descriptor file at step 240. In one embodiment, the editor services system can request a preview of the page from a CCM system through the services interface of the CCM system. This request may also have the identifier of the template and the page identifier for the page preview desired.

When this request is received at the CCM system, the CCM system may access the identified template through the content management system at which it is stored and determine the portion of the identified template associated with the page identified in the request. The content associated with that page identified from the template can be accessed and retrieved from the content management system and that page of the template generated by the content generator. The page generated may be, for example, in HTML or PDF format, or may be converted into HTML or PDF by output generator.

Additionally, the a page descriptor file for the page generated may be produced by the CCM system. This descriptor file may be a file describing the content items on the page, their size, which areas are editable (or not editable) or what type of editing may be done to each area (e.g., what content may be added or deleted from certain areas on the page). This descriptor file may be, for example, an XML file with tags associated with the one or more areas or content of the associated page. The descriptor file for the generated page may also include the editing control rules associated with respective content or area on the generated page as described in the template.

An editor interface including the page and a corresponding overlay may then be generated and presented by the editor. In particular, the editor may receive the generated page and corresponding descriptor file at step 250. The editor may then generate an overlay for the page. Specifically, the page descriptor file may be evaluated to determine areas or content of the page, and the type (if any) of editing functionality or capabilities allowed for corresponding areas or content of the page based on the XML of the page descriptor file In one embodiment, when generating the overlay for the page it can be determined for each area of the page or content of the page identified by the page descriptor file if that area or content has an editing control rule associated with it at step 260. If there are no editing control rule associated with an area or content the portion of the overlay for that area or portion may be generated at step 290. If there is an editing control rule associated with an area or content it can be determined if the user meets the editing rule (e.g., if the user meets or is associated with the user characteristic of the editing rule) at step 270.

In one embodiment, the editing rule evaluator may send a request to a user management system with an identifier of the user editing the template to determine if the user meets the user characteristic of the editing control rule. A portion of the overlay corresponding to that area or content of the page (e.g., the portion of the overlay intended to be displayed over, in the vicinity of, or otherwise associated with that area or content) can then be generated based on whether the user meets the editing control rule associated with the area or content at step 280. The portion of the overlay can visually indicates (such as by highlighting or the like) whether editing capabilities (e.g., associated with the editing control rule) are allowed in that area of with respect to that content or what types of editing functionality (e.g., associated with the editing control rule) are (or are not) allowed in that area or with respect to that content.

The generated page and the overlay may then be presented in the display of the browser through the editor interface at step 292. This presentation may be accomplished by, for example, writing the generated page and the overlay into the DOM associated with the editor interface such that the page is displayed in the editor interface and the overlay is displayed above, or on top of, the page. Thus, a user viewing the editor interface may be presented with an interface depicting a page of the template along with corresponding visual identifiers in the overlay of what areas or content in the displayed page is editable or what type of editing may be done in association with those areas or content.

It may be useful to an understanding of embodiments to discuss an example of the delegation of authoring controls for templates as described. Attention is thus directed to FIGS. 3-9 which depict example screenshots of interfaces that may be presented by embodiments of design, authoring or editing applications.

Figure 3A:
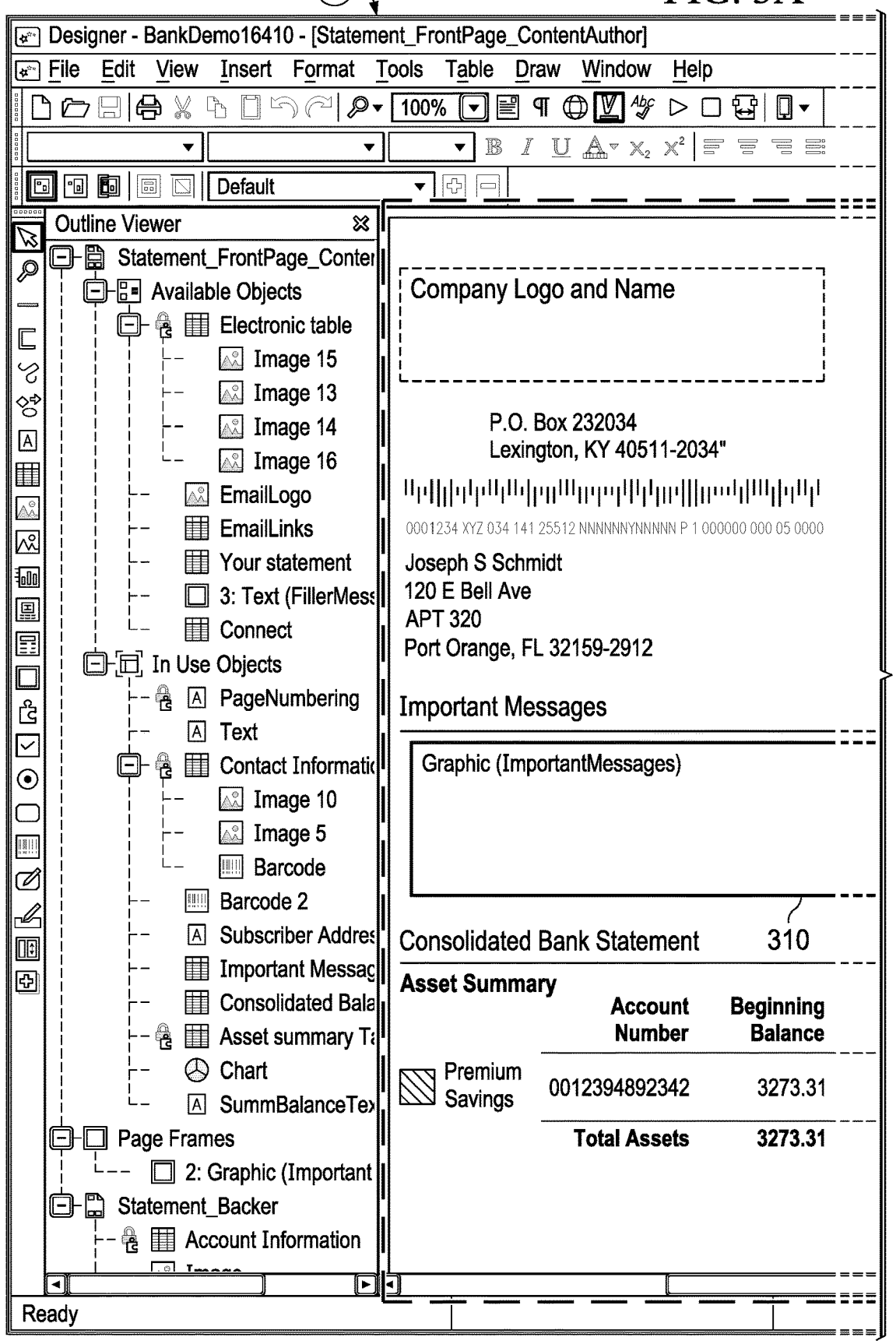
Figure 3B:
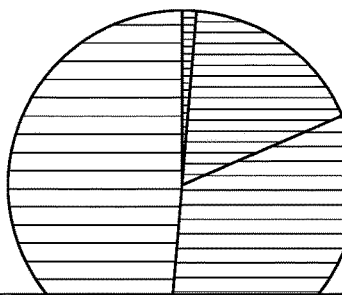

Referring first to FIGS. 3A-3B, a user at a design or authoring application may generate a template including one or more editing control rules may be generated. In one embodiment, users utilize a design application (e.g., which may be associated with a CCM system) to design a template including, or specifying, a number of assets (e.g., other content items). The design application may present the user with a graphical interface to allow the user to design and select content items for inclusion in the created template. Specifically in the depicted embodiment, an editing interface 300 may present an area 302 that depicts a representation of a template that may be used to create a banking statement being created.

When generating the template, the user may implement controls over the subsequent editing of the template by specifying one or more editing control rules in association with an area or content of the template. In certain embodiments, the design application may allow a user to specify which areas of the template may accept content or where content may otherwise be changed, added, removed or edited. This specification may include the specification of an editing control rule when specifying which areas of the template may accept content or where content may otherwise be changed, added, removed or edited. Thus, an editing control rule may specify for an area or content of a template a user characteristic and an associated editing capability associated with that user characteristic.

Here, for example, the user designing the template has designated that the "Important Messages" area 310 of the template being created or edited will be an area which can be edited be subsequent users. In particular, the user has designated an editing control rule for the area 310 of the template being created that specified a user characteristic (e.g., an "any user") may edit (e.g., add or alter) the content associated with the area 310. In the example depicted, the user has also specified that another template (e.g. template "2") may define the type of content that may be added to this area 310.

While in this example, the user characteristic may be a default "any user", in other embodiments, a user characteristics may be a group or role associated with a user within an enterprise. More particularly, a user characteristic may be a role as defined by a user management system such as an identity management system or the like, including roles that may be specially defined or created by the enterprise, or encompass entitlements of groupings specific to the enterprise.

An editing capability of an editing control rule may define an ability (or lack of ability) to edit an associated area, or a particular type of editing ability. For example, an editing capability may specify that a user may or may not edit an area of the template. An editing capability may also specify that a user may add content, but not delete content, or conversely that a user may delete content but not add content. Other editing capabilities may be imagined and are fully contemplated herein.

The template being created may then be saved for later use by the user designing the template. For example, the designed template may be saved in a content management system of an enterprise such that the template may be managed as content of the enterprise. This template being created, may, for example, be an XML document describing each page of the template, identifying content to appear on each of the pages, areas of each page, including for example, the location and size of content on the page (e.g., using document identifiers or locations within a content management system), what on each page of the template is editable, where content can be added, or other information associated with the template, including editing control rules associated with areas of the template.

Here, for example, the XML file for the template as depicted in FIGS. 3A-3B may be titled "bankstatementtemplate.xml" and may include the following XML:

```
<?xml version='1.0' encoding='utf-8'?>
<document:template
xmlns:document="http://schemas.streamserve.com/document/2.0
" xmlns:xsi="http://www.w3.org/2001/XMLSchema-instance"
processId="c623e0c2-d926-4154-9d84-81694427df3c"
docType="6A2180B4-3EC0-A21C-C8C7-12BD851FAD46"
processType="Exstream" name="Bank_Statement_Print"
xsi:schemaLocation="http://schemas.streamserve.com/document
/2.0 document.xsd">
    <doc displayName="Bank_Statement_Print" id="3">

<section displayName="Address" id="79a4a290-425a-4e92-860d-6d761c539612" description="" language="1">
                <accepts>
                    <accept type="exstrgraphicalmessage" messageTemplate="1"/>
                </accepts>
            </section>
            <section displayName="Info Graphic" id="934435e7-0c85-4cf8-b596-1447cc0ebb6f" description="" language="1">
                <accepts>
                    <accept type="exstrgraphicalmessage" messageTemplate="2"/>
                </accepts>
            </section>

</doc>
</document:template>
```

Notice here that the tag:

```
<section displayName="Info Graphic" id="934435e7-0c85-4cf8-
b596-1447cc0ebb6f" description="" language="1">
    <accepts>
        <accept type="exstrgraphicalmessage"
messageTemplate="2"/>
    </accepts>
</section>
``` designates an editing control rule that this Info Graphic area of the template can be edited by a user (e.g., the user characteristic "any user") based on an exstrgraphicalmessage. Moreover, this InfoGraphic area of the template may have an identifier of 934435e7-0c85-4cf8-b596-1447cc0ebb6f. In particular, this exstrgraphicalmessage that can be edited or created in this section by a user may be based on another template with an identifier of 2.

Put another way, in the example this XML designates that in the template created there is a frame/section called "Info Graphic" that accepts Graphic Messages of type "ImportantMessages". So there is a section tag with displayName="Info Graphic" which is referencing the frame. The <accept> tag indicates that area can only accept a message of type Graphical Message and messageTemplate=2 indicates that the content for this area has to be created from a template with id=2 (in this case "2" identifies the "ImportantMessages" template).

Figure 4:
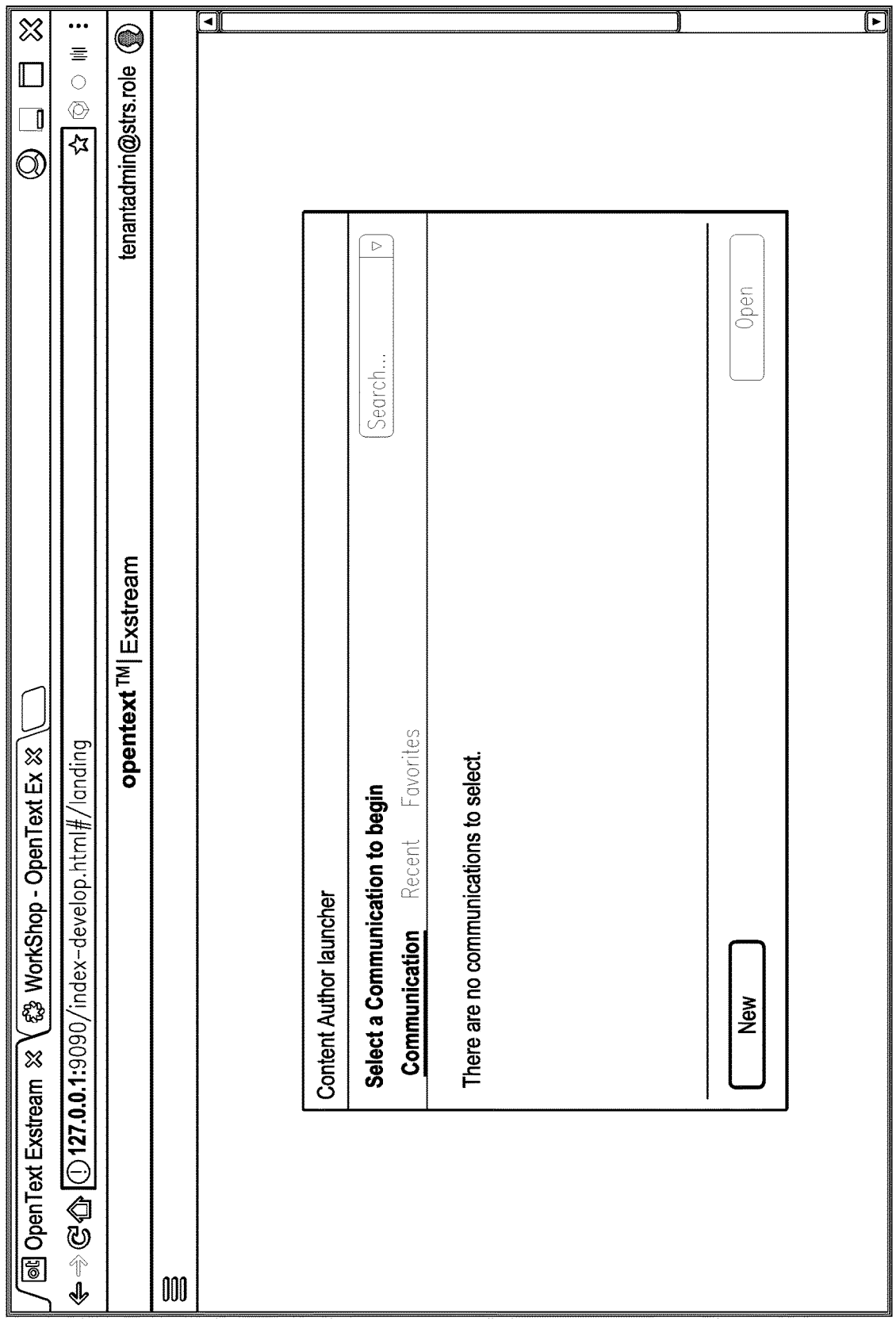
Figure 5:
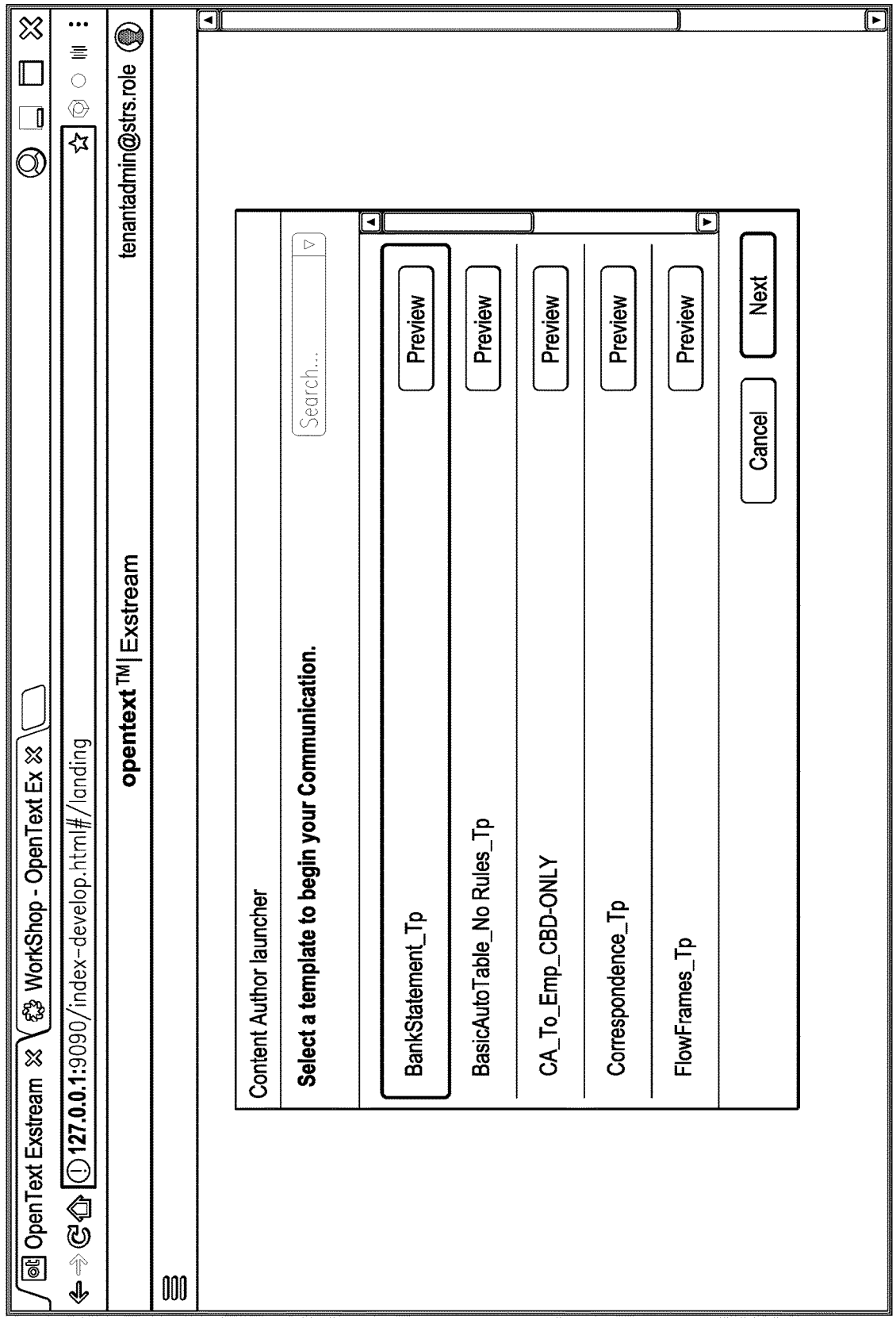
Figure 6B:
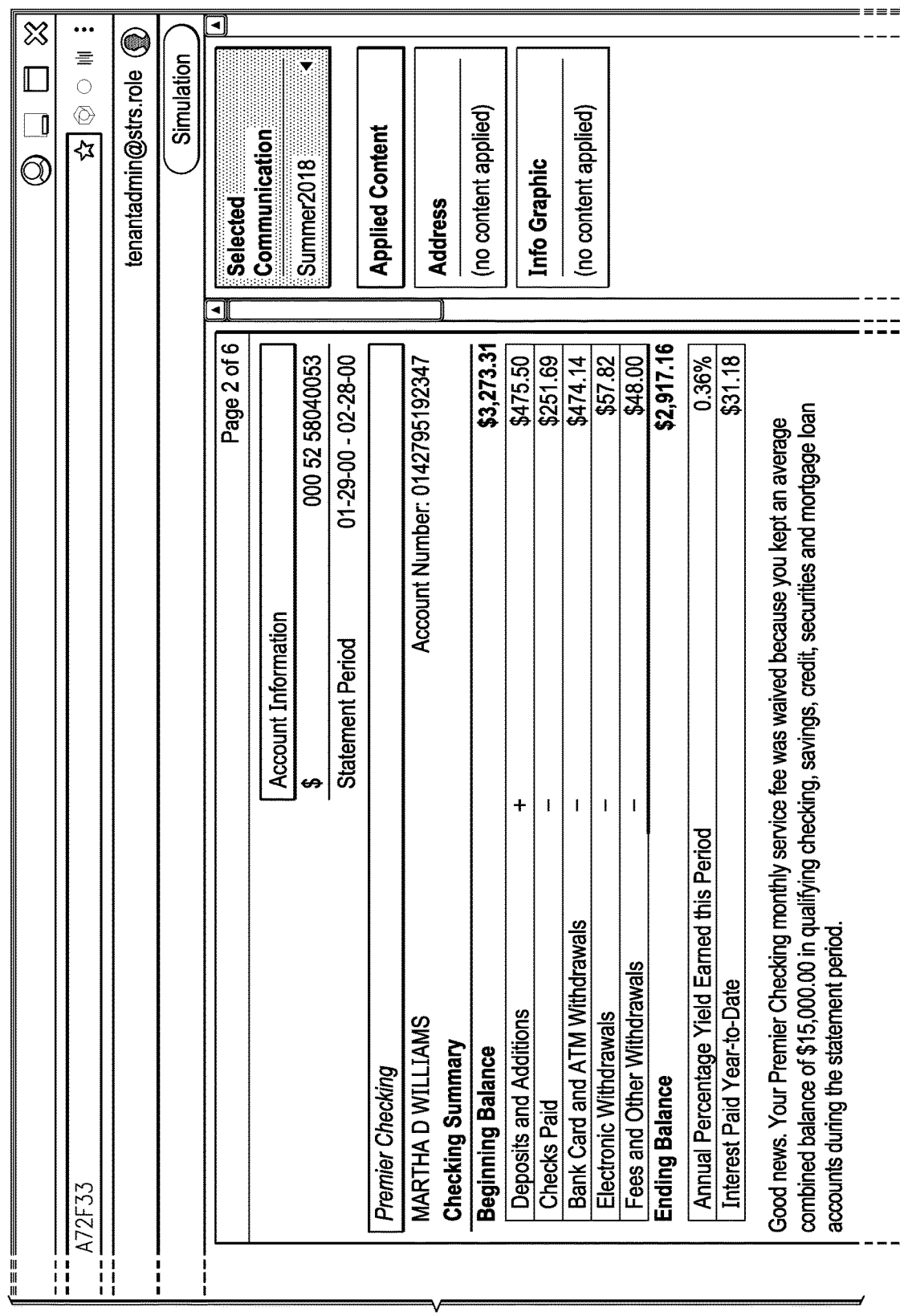
Figure 6C:
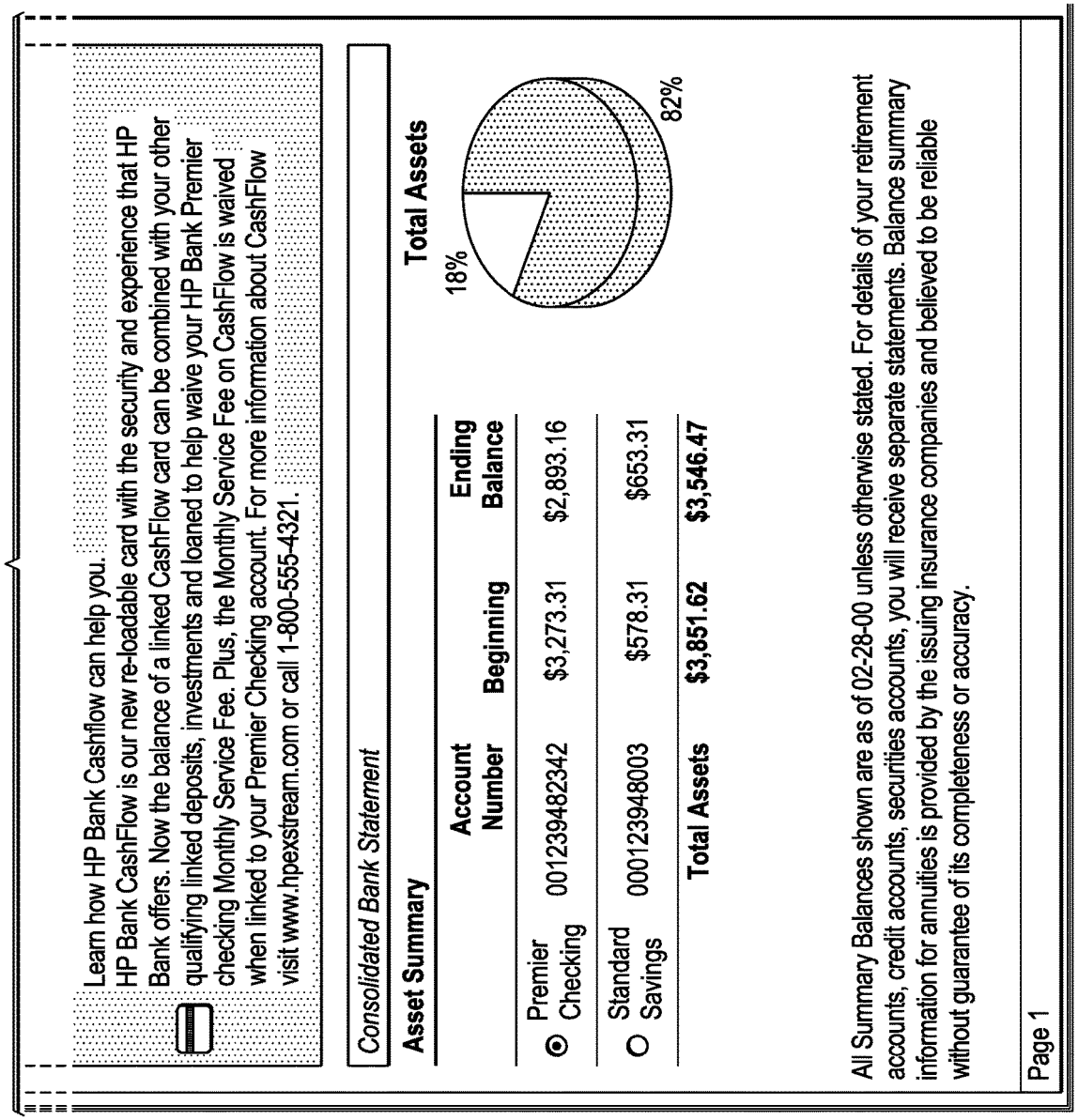
Figure 7C:
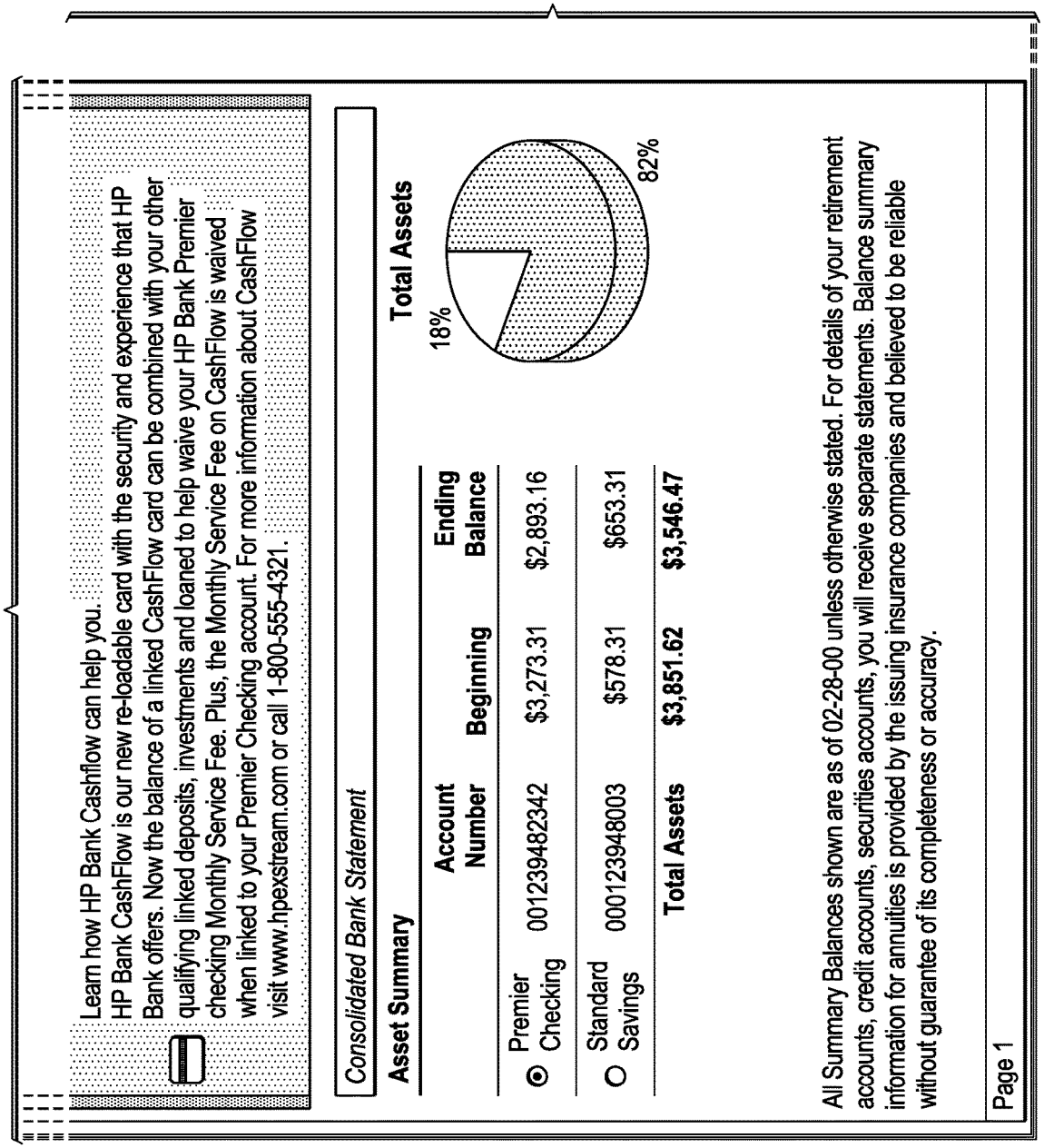

At some later point, this template may be edited by a user. FIGS. 4 and 5 show an example of interfaces for a thin-client editor for creating a theme from a selected template. Specifically, a thin-client editor may be executed by a browser application at a user's computing device (e.g., substantially regardless of the underlying platform or computing device on which the browser is executing). A user at his computing device may access the editor through his browser to create a new theme (as show in FIG. 4) and select a template on which to base this newly created theme. As discussed, a theme may be a version of the template as edited or created by a user and may have its own specific location and identifier in a content management system. For purposes of this disclosure, and the systems and methods described and disclosed herein, templates and themes may be thought of interchangeably.

Here, in this depicted example, the user may select a "New" button to create a new theme (as shown in FIG. 4). In FIG. 5, the bankstatementtemplate.xml previously created has been selected as the template on which to base the new theme. The user has clicked "next" and given the theme a name and description. In this example, the theme has been named "Summer2018" because it will be the marketing material for a summer 2018 marketing campaign. This will create a "theme.xml" file. By default the theme may initially is empty so there is very little in this file initially. Thus, the XML that may be stored for this theme at the content management system may reference the template from which it was created in the "templateID" parameter and be:

```
<?xml version="1.0" encoding="UTF-8" standalone="no"?>
<document:definition
xmlns:document="http://schemas.streamserve.com/document/2.0
" name="Summer2018"
templateId="Y3hyOi8_aWQ9MWQwMDFkMGEtZjMwNS01NDQ3LTliMTMtZTY
1YmViMGI3YTk5O3Y9MTt0PTY3NjZlZDc5LTFlNWMtYmE5MC1iNDg3LWNhYz
Q3NzU3NGQyNA==" templateName="Bank_Statement_Print"
templateVersion="">
    <section displayName="Address" id="79a4a290-425a-4e92-
860d-6d761c539612"/>
    <section displayName="Info Graphic" id="934435e7-0c85-
4cf8-b596-1447cc0ebb6f"/>
    <deliveryChannels/>
</document:definition>
```

The user (or the editor) may then open this newly created theme for editing. As depicted in FIGS. 6A-6D, a preview of the theme may be rendered for the user in the editor interface at the user's device. As discussed, in one embodiment, once a theme is created (or selected) by the user using the editor an identifier for that theme may be obtained by the editor for that theme and the editor may make a request to an editor services system with the identifier for the theme. This request can then be serviced (e.g., using a content generation engine) by accessing the theme and the related content identified by the theme and generating the preview for the theme so it can be returned to the editor along with a descriptor file.

The XML for the descriptor file for the example in this case may be as follows:

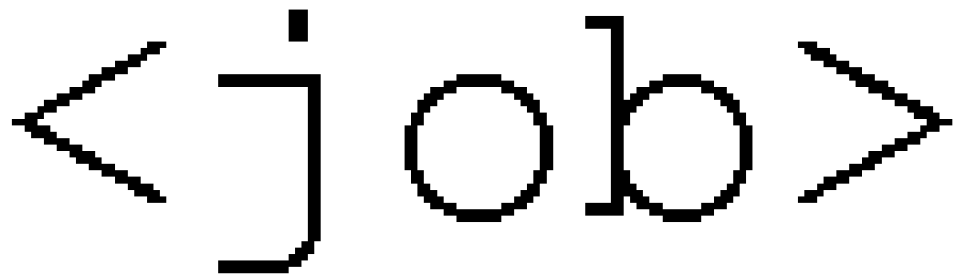

```xml
<stl:stl version="0.1"
xmlns:stl="http://developer.opentext.com/schemas/storyteller/layout"
xmlns:xp="http://developer.opentext.com/schemas/storyteller/xmlpreprocessor">
    <stl:document background="link:/background/document.pdf">
        <stl:page h="1056px" index="0" orientation="portrait" outputfile="/home/bootstrap/mgwroot/tmp/xstreamout_C08B70015407523997670.tmp"
            w="816px">
            <stl:box class="area" enabled="true" h="144px" w="288px" x="48px" y="192px">
                <stl:box class="span" data="s;79a4a290-425a-4e92-860d-6d761c539612" enabled="true" h="144px" w="288px" />
            </stl:box>
            <stl:box class="area" enabled="true" h="228px" w="720px" x="48px" y="433px">
                <stl:box class="span" data="s;934435e7-0c85-4cf8-b596-1447cc0ebb6f" enabled="true" h="228px" w="720px" />
            </stl:box>
        </stl:page>
        <stl:page h="1056px" index="1" orientation="portrait"
```

```
outputfile="/home/bootstrap/mgwroot/tmp/xstreamout_C08B7001
54075239976701.tmp"
            w="816px" />
        <stl:page h="1056px" index="2"
orientation="portrait"
outputfile="/home/bootstrap/mgwroot/tmp/xstreamout_C08B7001
54075239976702.tmp"
            w="816px" />
        <stl:page h="1056px" index="3"
orientation="portrait"
outputfile="/home/bootstrap/mgwroot/tmp/xstreamout_C08B7001
54075239976703.tmp"
            w="816px" />
        <stl:page h="1056px" index="4"
orientation="portrait"
outputfile="/home/bootstrap/mgwroot/tmp/xstreamout_C08B7001
54075239976704.tmp"
            w="816px" />
        <stl:page h="1056px" index="5"
orientation="portrait"
outputfile="/home/bootstrap/mgwroot/tmp/xstreamout_C08B7001
54075239976705.tmp"
            w="816px" />
    </stl:document>
    <varData><var id="501" type="0" value="HP Bank"
/><var id="502" type="0" value="N.A." /><var id="503"
type="0"
```

```
                value="P.O. Box 232034" /><var id="504"
type="0" value="Lexington, KY 40511-2034" /><var id="505"
type="0"
                value="www.hpexstream.com" /><var id="506"
type="0"
value="E:\ExDemo\OnDemand\Financial\HPExstreamBank\DCI\HP
Exstream Bank Logo.jpg" /><var
                id="507" type="0"
value="E:\ExDemo\OnDemand\Financial\HPExstreamBank\DCI\HP
Exstream Bank Logo no address.jpg" /><var
                id="508" type="0"
value="E:\ExDemo\OnDemand\Financial\HPExstreamBank\DCI\HPEx
streamBankEmail.png" /><var
                id="509" type="0"
value="E:\ExDemo\OnDemand\Financial\HPExstreamBank\DCI\"
/><var id="510" type="0"

value="https://images.esxdemo.com/demoframework/common/Fina
ncial/BankStatement/" /><var id="511" type="0"
                value="1-800-555-4321" /><var id="512"
type="0" value="1-800-555-0589" /><var id="515" type="0"
value="United States" /><var
                id="516" type="0" value="333333333" /><var
id="517" type="0" value="" /><var id="518" type="0"
value="Mrs." /><var
                id="519" type="0" value="Martha" /><var
id="520" type="0" value="D" /><var id="521" type="0"
value="Williams" /><var
``` id="522" type="0" value="1456 Spadafore Drive" /><var id="523" type="0" value="Clearville" /><var id="524"

type="0" value="PA" /><var id="525" type="0" value="155357305" /><var id="526" type="0" value="" /><var id="527" type="0" value="" /><var id="528" type="0" value="" /><var id="529" type="0" value="" /><var id="530" type="0" value="111111111" /><var id="531" type="0" value="0001238840033" /><var id="533" type="0"

value="S" /><var id="535" type="5" value="578.31" /><var id="536" type="3" value="0.35" /><var id="537"

type="5" value="8.93" /><var id="538" type="1" value="0" /><var id="559" type="5" value="85.00" /><var id="560" type="5" value="124.00" /><var id="569" type="0" value="English" /><var id="570" type="0"

value="Martha, Your Monthly HP Bank Statement is Available" /><var id="571" type="0" value="Statement" /><var id="572" type="0" value="Savings Summary" /><var id="573" type="0" value="Checking Summary" /><var id="577"

type="0" value="Statement Period" /><var id="578" type="0" value="Account Information" /><var id="579"

type="0" value="Contact Information" /><var id="580" type="0" value="Visit HP Exstream Bank Online Banking at" /><var id="581" type="0" value="Call a Customer Service Representative at" /><var id="582" type="0" value="Monday - Friday, 8 am - 12 am (ET), and Saturday, 8 am - 8 pm (ET)." /><var id="583" type="0" value="Asset Summary" /><var id="584" type="0" value="Account Number" /><var id="585"

type="0" value="Beginning Balance" /><var id="586" type="0" value="Ending Balance" /><var id="587" type="0"

value="Total Assets" /><var id="588" type="0" value="Deposits and Additions" /><var id="589" type="0"

value="Checks Paid" /><var id="590" type="0" value="Bank Card and ATM Withdrawals" /><var id="591" type="0"

value="Withdrawals" /><var id="592" type="0" value="Electronic Withdrawals" /><var id="593" type="0"

value="Fees and Other Withdrawals" /><var id="594" type="0" value="Annual Percentage Yield Earned This Period" /><var id="595" type="0" value="Interest Paid Year-to-Date" /><var id="596" type="0" value="continued" /><var id="597" type="0" value="DATE" /><var id="598" type="0" value="DESCRIPTION" /><var id="599" type="0"

value="AMOUNT" /><var id="600" type="0" value="DATE PAID" /><var id="601" type="0" value="CHECK NO." /><var id="602" type="0" value="If you see a description in the Check Paid section, it means that we received only electronic information about the check, not the original or an image of the check. As a result we are not able to return the check to you or show you an image." /><var id="603" type="0" value="Overdraft and Returned Item Fee Summary" /><var id="604" type="0" value="Total Overdraft Fees" /><var id="605" type="0" value="Total Returned Item Fees" /><var id="606" type="0" value="Total Overdraft Fees include Insufficient Fees, and Extended Overdraft Fees." /><var id="607" type="0" value="EMAIL" /><var id="608" type="0" value="customer@hpexstream.com" /><var id="609"

type="0" value="online" /><var id="611" type="0" value="SMTP_LOCAL" /><var id="612" type="0" value="" /><var id="613" type="0" value="email_id" /><var id="614" type="0" value="Martha, Your Monthly HP Bank Statement is Available" /><var

```
                id="615" type="0" value="text/html" /><var
id="616" type="0"
value="E:\ExDemo\OnDemand\Financial\HPExstreamBank\Out\Bank
StatementEmail_333333333.html" /><var id="617" type="0"
value="E:\ExDemo\OnDemand\Financial\HPExstreamBank\Out\"
/><var id="618" type="0"

value="" /><var id="619" type="0" value=""
/><var id="621" type="0" value="" /><var id="622" type="1"

value="8" /><var id="623" type="1"
value="1" /><var id="624" type="0" value="N" /><var
id="627" type="5"

value="15000.00" /><var id="628" type="5"
value="5000.00" /><var id="629" type="0"
value="E:\ExDemo\OnDemand\Financial\HPExstreamBank\Out\Bank
StatementEmail_333333333.html" /><var id="630" type="0" value="DONE" /><var
id="631" type="0" value="" /><var id="634" type="0"
value="" /><var id="635" type="5" value="120.00" /><var
id="636" type="5" value="0.00" /><var id="637" type="5"
value="0.00" /><var id="638" type="5" value="0.00" /><var
id="639" type="5" value="45.00" /><var id="640" type="5"
value="0.00" /><var id="641" type="5" value="653.31" /><var
id="642" type="5" value="3540.47" /><var id="643" type="5"
```

```
                    value="0.00" /><var id="644" type="5"
value="0.00" /><var id="646" type="0" value="" /><var
id="648"

type="5" value="3851.62" /><var id="649"
type="0" value="Standard Savings" /><var id="650" type="1"

value="2" /><var id="651" type="0"
value="Savings Summary" /><var id="662" type="0"
value="Martha Williams - 333333333" /><var id="663" type="0" value="" /><var id="664"
type="0" value="1553573051456 " /><var id="665" type="0"

value="155357305" /><var id="666" type="5"
value="0.00" /><var id="668" type="1" value="0" /><var
id="669"

type="1" value="1" /><var id="670" type="0"
value="Total YTD" /><var id="671" type="0" value="Total
This-Period" /><var id="672" type="1" value="2" /><var id="673"
type="0" value="http://www8.hp.com/us/en/software/exstream-
software.html?compURI=1383581#.Va6uo_lVhBc" /><var id="674" type="0" value="Scan the QR Code
with your smart phone to access" /><var id="675" type="0"

value="Customer Service" /><var id="676"
type="0" value="Important Messages" /><var id="677"
type="0"

value="Consolidated Bank Statement" /><var
id="678" type="0" value="Check Images" /><var id="679"
type="0"
```

```
            value="Images of cleared checks from the
current statement period" /><var id="682" type="2"
value="TRUE" /><var id="683" type="5" value="100.00" /><var
id="684" type="1" value="10" /><var id="685" type="3"
value="0.30" /><var day="18" id="513" month="12" type="4"
year="2012" /><var day="17" id="514" month="1" type="4"
year="2013" /><var day="28" id="625" month="2" type="4"
year="2000" /><var day="28" id="626" month="3" type="4"
year="2000" /><var day="29" id="652" month="1" type="4"
year="2000" /><var day="17" id="680" month="7" type="4"
year="2017" /></varData>

<stl:fixtures>

<xp:fixture key="link:/background/document.pdf"
type="application/pdf" />

</stl:fixtures>

</stl:stl>

</job>
```

Notice that in this example the descriptor file includes the XML:

```
<stl:box class="area" enabled="true" h="228px" w="720px"
x="48px" y="433px">
        <stl:box class="span" data="s;934435e7-
0c85-4cf8-b596-1447cc0ebb6f" enabled="true" h="228px"
w="720px" />
    </stl:box>
```

Corresponding to area 602 indicating both that it is editable and that it corresponds to identifier 934435e7-0c85-4cf8-b596-1447cc0ebb6f associated with an exstrgraphicalmessage that can be edited or created in this section by a user and may be based on another template with an identifier of 2.

When the editor at the user's device receives the generated preview page and the associated descriptor file, the editor generates an overlay for the preview page with an area highlighting where the user may add or edit content for the theme based on the page descriptor file. When generating the overlay for the page, the editor may evaluate the page descriptor file to determine areas of the page, and the type (if any) of editing functionality or capabilities allowed for corresponding areas or content of the page and any corresponding editing rules based on the XML of the page descriptor file.

As depicted here, area 602 may be highlighted (e.g., using the generated overlay) to depict where the user may add or otherwise edit content. Here, for example, as depicted in FIGS. 7A-7D, the user may "click" in area 602 of the editor interface and the "add content" button 702 to indicate that he want to add content to this area 602 of the template. The user may then add or create content in the associated area 602. In one embodiment, the editor may provide, or automatically create, the correct type of content based on the permissions and the identified type of content in the template XML file (e.g., bankstatementtemplate.xml). Specifically, here, as the area of the theme may be associated with identifier 934435e7-0c85-4cf8-b596-1447cc0ebb6f in the page descriptor file (as shown in the XML above) it can be determined that the content to be included in area 602 may be based on the template with an identifier of 2.

When the user chooses to edit the area 602, an object for the edited content (e.g., a JSON file) may be created by the editor (e.g., in a content management system of the enterprise). In response to the creation of this object (e.g., JSON file), an identifier for this object may be returned an included in the theme (e.g., in the XML of the theme) being edited at the appropriate location corresponding to the area (e.g., 602) being edited.

The XML of the theme being edited after the user edits the content associated with area 602 as shown may be the following:

```
<?xml version="1.0" encoding="UTF-8" standalone="no"?>
<document:definition
xmlns:document="http://schemas.streamserve.com/document/2.0
" name="Summer2018"
templateId="Y3hyOi8_aWQ9MWQwMDFkMGEtZjMwNS01NDQ3LTliMTMtZTY
1YmViMGI3YTk5O3Y9MTt0PTY3NjZlZDc5LTFlNWMtYmE5MC1iNDg3LWNhYz
Q3NzU3NGQyNA==" templateName="Bank_Statement_Print"
templateVersion=" ">
    <section displayName="Address" id="79a4a290-425a-4e92-
860d-6d761c539612"/>
    <section displayName="Info Graphic" id="934435e7-0c85-
4cf8-b596-1447cc0ebb6f">
        <resource
id="Y3hyOi8_aWQ9MjYxZWFhOTgtMDhlNy03YzQ5LWFhMDAtMGY5MWIzZTV
jYjg4O3Y9LTE7dD0xMzM2MzZlMy1iOWZkLTFkZTQtYWRiNy03YjEzNTMzN2
FiYWI7cz0z" name="Test"
previewId="Y3hyOi8_aWQ9MjYxZWFhOTgtMDhlNy03YzQ5LWFhMDAtMGY5
MWIzZTVjYjg4O3Y9LTE7dD0xMzM2MzZlMy1iOWZkLTFkZTQtYWRiNy03YjE
zNTMzN2FiYWI=" uri="strs://cc/res/0"/>
    </section>
    <deliveryChannels/>
</document:definition>
```

Notice here that the edited theme now includes the following XML:

```
<section displayName="Info Graphic" id="934435e7-0c85-
4cf8-b596-1447cc0ebb6f">
    <resource
id="Y3hyOi8_aWQ9MjYxZWFhOTgtMDhlNy03YzQ5LWFhMDAtMGY5MWIzZ
TVjYjg4O3Y9LTE7dD0xMzM2MzZlMy1iOWZkLTFkZTQtYWRiNy03YjEzNT
MzN2FiYWI7cz0z" name="Test"
previewId="Y3hyOi8_aWQ9MjYxZWFhOTgtMDhlNy03YzQ5LWFhMDAtMG
Y5MWIzZTVjYjg4O3Y9LTE7dD0xMzM2MzZlMy1iOWZkLTFkZTQtYWRiNy0
3YjEzNTMzN2FiYWI=" uri="strs://cc/res/0"/>
</section>
``` indicating that the area 602 associated with identifier 934435e7-0c85-4cf8-b596-1447cc0ebb6f will include the resource identified by the identifier Y3hyOi8_aWQ9MjYxZWFhOTgtMDhlNy03YzQ5LWFhMDAtMG-Y5MWIzZTVjYjg4O3Y9LTE7dD0xMzM2MzZlMy1iOW-ZkLTFkZTQtYWRiNy03YjEzNTMzN2FiYWI7cz0z, which may be the identifier returned by the content management system when the object (e.g., JSON file) was created for that area in the content management system by the editor in response to a user's indication that he wished to edit the content of the area.

Figure 8:
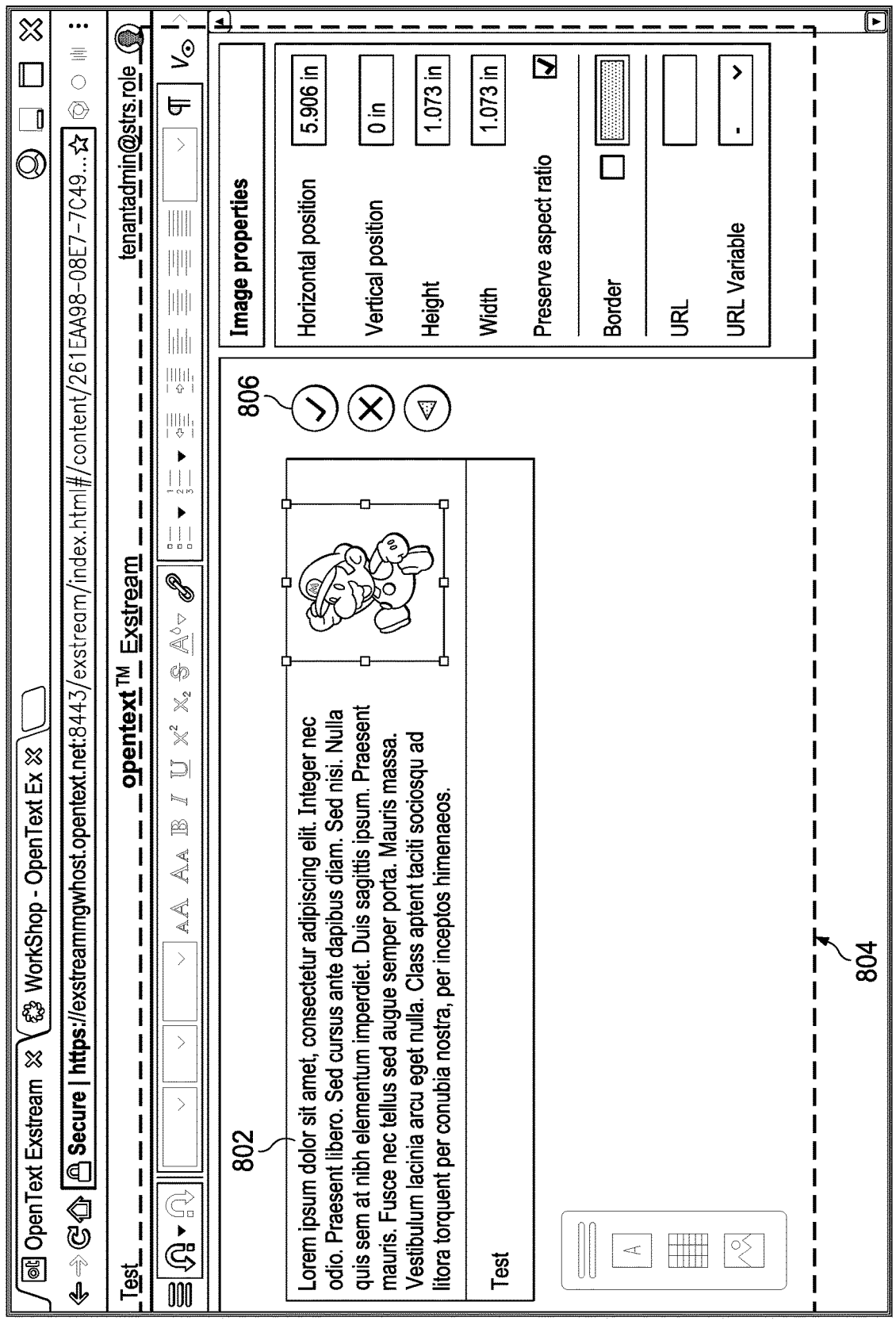
Figure 9A:
Figure 9C:
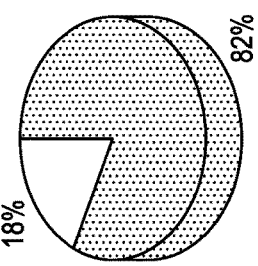

Looking at FIG. 8 now, accordingly, when the user chooses to edit the area 602, the editor may open a designer interface 804 and allow the user to add or edit text, images or other content 802 to this area using the designer based on, for example, editing content rules or other permission associated with the area 602 in the page descriptor file. When the user clicks a save button 806, or otherwise indicates, that the editing is complete, the data associated with the change, including any changes, new, or altered content may be communicated to the content management system and stored in the file (e.g., object) created for the edited content. For example, here, the content may be stored in the file associated with the resource identifier Y3hyOi8_aWQ9MjYx-ZWFhOTgtM DhlNy03YzQ5LWFhMDAtMGY5MWlzZT-VjYjg4O3Y9LTE7dD0xMzM2MzZIMy1iOWZkLTFkZT-QtYWRiNy03YjEzNTMzN2FiYWI7cz0z. This changed or new content may be communicated, for example, as JSON to be stored in the created JSON object at a content management system of the enterprise.

For example, here, the JSON communicated to be stored may be:

```
"m_lTableNumber": 21,
"m_strName": "",
"m_ePageType": 1,
"m_iDesignResolution": 1000,
"m_Size": {
    "width": 7500,
    "height": 1150
},
"m_bSendDefault": true,
"m_refUsageRule": 0,
"m_scopedMessageTemplate": 2,
"contents": {
    "m_lResolution": 1000,
    "m_bTextOnly": false,
    "m_lWidth": 7500,
    "m_lHeight": 1150,
    "m_lTopMargin": 0,
    "m_lBottomMargin": 0,
    "m_lGrowMaxY": 1150,
    "m_bHasDynamicBottom": false,
    "m_bAllStatic": false,
    "m_bHasStatic": false,
    "m_iGrowth": 0,
    "m_DrawFront": [
        {
            "m_eComponentType": 6,
            "m_pDrawObj": {
                "m_oiID": 655417485,
                "m_UNITSPERINCH": 1000,
                "m_bPen": 0,
                "m_pDbBitmap": {
                    "m_oiDB": 1696230698,
                    "m_strCASId":
"Y3hyOi8_aWQ9YWY2NjIzNGItYjc1NS00NTQ5LWFkZWUtMzIwNzk5ZDk0N2FlO3Y9MTt0PWVlNTk1OWIwLWVmYzQtZDlkMi1mN2Q3LTJiNWUwYTVmMDhjMA=="
                },
                "m_oiLayer": 0,
                "m_rectPosition": {
                    "left": 5906,
                    "top": 0,
                    "bottom": 1073,
                    "right": 6979
                },
                "m_ePosRelToAbove": 0
            }
        },
        {
            "m_eComponentType": 14,
            "m_pDrawObj": {
                "m_UNITSPERINCH": 1000,
                "m_bPen": false,
                "m_iPenWidth": 1,
                "m_iPenStyle": 0,
                "m_clrPen": {
                    "m_eColorModel": 0,
                    "m_lColor": 0
                },
                "m_rectPosition": {
                    "left": 302,
                    "right": 5667,
```

-continued

```
        "top": 156,
        "bottom": 989
    },
    "m_oiID": 1340074973,
    "m_pEditableProps": {
        "m_eEditChangeType": 0,
        "m_bCanType": false,
        "m_eTextField": 3,
        "m_bCanChangeFormat": false,
        "m_bCanChangeProperties": false,
        "m_iCanDoObjProps": 0,
        "m_msLink": "",
        "m_eLinkType": 1,
        "m_oiLink": 0,
        "m_ownsObjectRefMetadata": [ ],
        "m_oiObjPropsVarOIs": [
            0,
            0,
            0,
            0,
            0,
            0,
            0,
            0
        ],
        "editor_isEdited": true
    },
    "m_oiLayer": 0,
    "m_ePosRelToAbove": 0,
    "m_iSizeMaximum": 11000,
    "m_bAutoSizeX": false,
    "m_bAutoSizeY": false,
    "m_iLogicalRes": 1000,
    "m_iDesignRes": 1000,
    "m_iWidth": 0,
    "m_iHeight": 0,
    "m_eFrameStyle": 0,
    "m_iLeftMargin": 0,
    "m_iRightMargin": 0,
    "m_iTopMargin": 0,
    "m_iBottomMargin": 0,
    "m_bBackGroundTransparent": true,
    "m_bHideEmpty": false,
    "m_ParaValues": [
        {
            "m_iEditAreaNdx": -1,
            "iNumbering": 0,
            "iDefaultTab": 250,
            "iBulletFont": -1,
            "bUserSetType": false
        }
    ],
    "m_TextFonts": [
        {
            "oiFont": 88,
            "strName": "Arial",
            "iTracking": 0,
            "clrFontColor": {
                "m_eColorModel": 0,
                "m_lColor": 0
            },
            "iFontHeight10X": 120,
            "bBold": false,
            "bItalic": false,
            "bUnderline": false
        },
        {
            "oiFont": 90,
            "strName": "Arial",
            "iTracking": 0,
            "clrFontColor": {
                "m_eColorModel": 0,
                "m_lColor": 0
            },
            "iFontHeight10X": 100,
            "bBold": false,
            "bUnderline": false,
            "bItalic": false,
            "uUnderWgt": 0,
```

```
                    "sUnderPos": -32768,
                    "iAscent": 38,
                    "iDescent": 9,
                    "iLeading": 1
                }
            ],
            "m__Colors": [
                {
                    "m__eColorModel": 0,
                    "m__lColor": 0
                },
                {
                    "m__eColorModel": 0,
                    "m__lColor": 12648192
                },
                {
                    "m__eColorModel": 0,
                    "m__lColor": 255
                }
            ],
            "m__cChars": [
0, 0, 1, 0, 76, 111, 114, 101, 109, 32, 105, 112, 115, 117, 109, 32,
100, 111, 108, 111, 114, 32, 115, 105, 116, 32, 97, 109, 101, 116,
44, 32, 99, 111, 110, 115, 101, 99, 116, 101, 116, 117, 114, 32, 97,
100, 105, 112, 105, 115, 99, 105, 110, 103, 32, 101, 108, 105, 116,
46, 32, 73, 110, 116, 101, 103, 101, 114, 32, 110, 101, 99, 32, 111,
100, 105, 111, 46, 32, 80, 114, 97, 101, 115, 101, 110, 116, 32,
108, 105, 98, 101, 114, 111, 46, 32, 83, 101, 100, 32, 99, 117, 114,
115, 117, 115, 32, 97, 110, 116, 101, 32, 100, 97, 112, 105, 98,
117, 115, 32, 100, 105, 97, 109, 46, 32, 83, 101, 100, 32, 110, 105,
115, 105, 46, 32, 78, 117, 108, 108, 97, 32, 113, 117, 105, 115, 32,
115, 101, 109, 32, 97, 116, 32, 110, 105, 98, 104, 32, 101, 108,
101, 109, 101, 110, 116, 117, 109, 32, 105, 109, 112, 101, 114, 100,
105, 101, 116, 46, 32, 68, 117, 105, 115, 32, 115, 97, 103, 105,
116, 116, 105, 115, 32, 105, 112, 115, 117, 109, 46, 32, 80, 114,
97, 101, 115, 101, 110, 116, 32, 109, 97, 117, 114, 105, 115, 46,
32, 70, 117, 115, 99, 101, 32, 110, 101, 99, 32, 116, 101, 108, 108,
117, 115, 32, 115, 101, 100, 32, 97, 117, 103, 117, 101, 32, 115,
101, 109, 112, 101, 114, 32, 112, 111, 114, 116, 97, 46, 32, 77, 97,
117, 114, 105, 115, 32, 109, 97, 115, 115, 97, 46, 32, 86, 101, 115,
116, 105, 98, 117, 108, 117, 109, 32, 108, 97, 99, 105, 110, 105,
97, 32, 97, 114, 99, 117, 32, 101, 103, 101, 116, 32, 110, 117, 108,
108, 97, 46, 32, 67, 108, 97, 115, 115, 32, 97, 112, 116, 101, 110,
116, 32, 116, 97, 99, 105, 116, 105, 32, 115, 111, 99, 105, 111,
115, 113, 117, 32, 97, 100, 32, 108, 105, 116, 111, 114, 97, 32,
116, 111, 114, 113, 117, 101, 110, 116, 32, 112, 101, 114, 32, 99,
111, 110, 117, 98, 105, 97, 32, 110, 111, 115, 116, 114, 97, 44, 32,
112, 101, 114, 32, 105, 110, 99, 101, 112, 116, 111, 115, 32, 104,
105, 109, 101, 110, 97, 101, 111, 115, 46, 32, 0
            ],
            "m__sXPos": [
                -244,
                0,
                -62,
                -63,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0, 0,
0, 0, 0, 0, 0, 0,
            ],
            "m__pObjs": [ ],
            "m__Objs": [ ],
            "m__Links": [ ],
            "m__VarProps": [ ],
            "m__ppEditableAreas": [ ],
```

```
                "m_Rules": [ ]
            },
            "m_oiID": 1340074973
        }
    ],
    "m_FrontRelNdx": [ ],
    "m_iFrontBottomMin": 101,
    "m_iFrontStaticBottom": 750,
    "m_iFrontDynBottom": 750,
    "m_bHasFlowLists": false
    },
    "rule": null
}
```

Subsequently, the editor can make another preview request to the editor services system through the services interface identifying the theme. The (altered) theme can then be accessed along with the content associated with that page identified from the theme (which may include the changed or added content) that may be accessed and retrieved from the content management systems. The review of the template along with the descriptor file can then be generated and returned to the editor at the user's computer device. For example, the XML of the descriptor generated based on the altered theme may be:

Notice here that the XML:

```
<stl:box class="area" enabled="true" h="228px" w="720px"
x="48px" y="433px">
            <stl:box class="span" data="s;934435e7-
0c85-4cf8-b596-1447cc0ebb6f" enabled="true" h="228px"
w="720px">
                        <stl:box class="span"
data="f;Y3hyOi8_aWQ9MjYxZWFhOTgtMDhlNy03YzQ5LWFhMDAtMGY5MWI
zZTVjYjg4O3Y9LTE7dD0xMzM2MzZlMy1iOWZkLTFkZTQtYWRiNy03YjEzNT
MzN2FiYWI=" h="110px" placed="all" sourceFrame="934435e7-
0c85-4cf8-b596-1447cc0ebb6f" sourceIndex="0" w="720px" />
            </stl:box>
        </stl:box>
``` indicates that the area identified by identifier 934435e7-0c85-4cf8-b596-1447cc0ebb6f is populated with content associated with identifier Y3hyOi8_aWQ9MjYxZW-FhOTgtMDhlNy03YzQ5LWFhMDAtMGY5MWIzZTVj-Yjg4O3Y9LTE7dD0xMzM2MzZlMy1iOWZkLTFkZTQt-YWRiNy03YjEzNTMzN2FiYW I7cz0z.

A new preview and overlay, as depicted in FIGS. 9A-9D, can then be rendered and displayed to the user in the browser based on the page descriptor file such that the user now sees his edited/updated page in the editor interface displayed in the browser along with an overlay including highlighted areas (or other indicators) indicating area 602 is editable.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A content editing system for providing hierarchical content editing in a distributed and networked enterprise environment, comprising:

a content management system managing a set of templates, including a template adapted to generate a plurality of pages from the template including a first page with first content associated with an editing rule, the editing rule designated by a first user that created the template at a first user computing device and wherein the editing rule associated with the template specifies a user characteristic and associated editing capability for the first content of the first page of the template;

a non-transitory computer readable medium, comprising instructions for an editor, the editor for executing on a second computing device of a second user to allow the second user to edit the template by:

requesting the first page to be generated from the first template, wherein the first page is generated in response to receiving the first request;

receiving the generated first page and a descriptor file for the generated first page, the descriptor file including the editing rule associated with the first content of the first page of the template;

evaluating the page descriptor file to determine the first content of the first page is associated with the editing rule associated with the template;

determining whether the second user meets the user characteristic specified by the editing rule associated with the template;

generating an overlay for the generated first page comprising a visual indicator based on the determination of whether the second user meets the editing rule for the template, wherein a portion of the overlay corresponding to an area of the generated first page associated with the first content is adapted to visually present an indication that the second user is allowed the associated editing capability with respect to the first content when it is determined the second user meets the user characteristic specified by the editing rule associated with the first content of the first page and wherein the overlay is adapted to handle user interactions associated with the editing capability with respect to the first content;

presenting the generated first page and the generated overlay in the interface of the editor at the second computing device of the second user;

determining an edit to the first content in the presented generated first page based on the generated overlay; and requesting a save associated with the edited first content based on the edit to the first content, wherein the requested save is adapted to cause the edited first content to be stored as new content and the first template to be edited at the content management system to reference the stored edited first content.

2. The system of claim 1, wherein determining whether the second user meets the user characteristic specified by the editing rule comprises sending a request with an identifier of the second user from the editor at the second computing device to a user management system to determine if the second user meets the user characteristic.

3. The system of claim 2, wherein the user characteristic is a group or a role within the networked enterprise environment.

4. The system of claim 1, wherein the editor is a thin-client editor for executing on a browser at the second computing device of the second user.

5. The system of claim 1, wherein requesting the first page to be generated for the template comprises:
sending a request from the editor to an editor services system, wherein the editor services system:
sends a request to a customer communication management (CCM) system to generate the first page;
receives the generated first page and the descriptor file for the generated first page from the CCM system; and
returns the generated first page and the descriptor file for the generated first page to the editor at the second computing device of the second user.

6. A non-transitory computer readable medium, comprising instructions for providing hierarchical content editing in a distributed and networked enterprise environment, comprising instructions for an editor:
requesting a first page to be generated from a template, wherein the first page is generated in response to receiving the request; the template stored at a content management systems managing a set of templates, including the template adapted to generate a plurality of pages from the template including the first page with first content associated with an editing rule, the editing rule designated by a first user that created the template at a first user computing device and wherein the editing rule associated with the template specifies a user characteristic and associated editing capability for the first content of the first page of the template and the editor is executing on a second computing device of a second user;

receiving the generated first page and a descriptor file for the generated first page, the descriptor file including the editing rule associated with the first content of the first page of the template;

evaluating the page descriptor file to determine the first content of the page is associated with the editing rule associated with the template;

determining whether the second user meets the user characteristic specified by the editing rule associated with the template;

generating an overlay for the generated first page comprising a visual indicator based on the determination of whether the second user meets the editing rule for the template, wherein a portion of the overlay corresponding to an area of the generated first page associated with the first content is adapted to visually present an indication that the second user is allowed the associated editing capability with respect to the first content when it is determined the second user meets the user characteristic specified by the editing rule associated with the first content of the first page and wherein the overlay is adapted to handle user interactions associated with the editing capability with respect to the first content;

presenting the generated first page and the generated overlay in the interface of the editor at the second computing device of the second user determining an edit to the first content in the presented generated first page based on the generated overlay; and requesting a save associated with the edited first content based on the edit to the first content, wherein the requested save is adapted to cause the edited first content to be stored as new content and the template to be edited at the content management system to reference the stored edited first content.

7. The non-transitory computer readable medium of claim 6, wherein determining whether the second user meets the user characteristic specified by the editing rule comprises sending a request with an identifier of the second user from the editor at the second computing device to a user management system to determine if the second user meets the user characteristic.

8. The non-transitory computer readable medium of claim 7, wherein the user characteristic is a group or a role within the networked enterprise environment.

9. The non-transitory computer readable medium of claim 6, wherein the editor is a thin-client editor for executing on a browser at the second computing device of the second user.

10. The non-transitory computer readable medium of claim 6, wherein requesting the first page to be generated for the template comprises:
sending a request from the editor to an editor services system, wherein the editor services system:
sends a request to a customer communication management (CCM) system to generate the first page;
receives the generated first page and the descriptor file for the generated first page from the CCM system; and returns the generated first page and the descriptor file for the generated first page to the editor at the second computing device of the second user.

11. A method for providing hierarchical content editing in a distributed and networked enterprise environment, comprising at an editor:
- requesting a first page to be generated from a template, wherein the first page is generated in response to receiving the request; the template stored at a content management systems managing a set of templates, including the template adapted to generate a plurality of pages from the template including the first page with first content associated with an editing rule, the editing rule designated by a first user that created the template at a first user computing device and wherein the editing rule associated with the template specifies a user characteristic and associated editing capability for the first content of the first page of the template and the editor is executing on a second computing device of a second user;
- receiving the generated first page and a descriptor file for the generated first page, the descriptor file including the editing rule associated with the first content of the first page of the template;
- evaluating the page descriptor file to determine the first content of the page is associated with the editing rule associated with the template;
- determining whether the second user meets the user characteristic specified by the editing rule associated with the template;
- generating an overlay for the generated first page comprising a visual indicator based on the determination of whether the user meets the editing rule for the template, wherein a portion of the overlay corresponding to an area of the generated first page associated with the first content is adapted to visually present an indication that the second user is allowed the associated editing capability with respect to the first content when it is determined the user meets the user characteristic specified by the editing rule associated with the first content of the first page and wherein the overlay is adapted to handle user interactions associated with the editing capability with respect to the first content;
- presenting the generated first page and the generated overlay in the interface of the editor at the second computing device of the user
  - determining an edit to the first content in the presented generated first page based on the generated overlay; and
  - requesting a save associated with the edited first content based on the edit to the first content, wherein the requested save is adapted to cause the edited first content to be stored as new content and the template to be edited at the content management system to reference the stored edited first content.

12. The method of claim 11, wherein determining whether the second user meets the user characteristic specified by the editing rule comprises sending a request with an identifier of the second user from the editor at the second computing device to a user management system to determine if the second user meets the user characteristic.

13. The method of claim 12, wherein the user characteristic is a group or a role within the networked enterprise environment.

14. The method of claim 11, wherein the editor is a thin-client editor for executing on a browser at the second computing device of the second user.

15. The method of claim 11, wherein requesting the first page to be generated for the template comprises:
- sending a request from the editor to an editor services system, wherein the editor services system:
  - sends a request to a customer communication management (CCM) system to generate the first page;
  - receives the generated first page and the descriptor file for the generated first page from the CCM system; and
  - returns the generated first page and the descriptor file for the generated first page to the editor at the second computing device of the second user.

* * * * *